United States Patent [19]
Higuchi et al.

[11] Patent Number: 5,914,943
[45] Date of Patent: Jun. 22, 1999

[54] APPARATUS AND METHOD FOR ESTABLISHING ACQUISITION OF SPREADING CODE IN CDMA TRANSMISSION SYSTEM

[75] Inventors: Kenichi Higuchi; Mamoru Sawahashi, both of Yokosuka; Fumiyuki Adachi, Yokohama, all of Japan

[73] Assignee: NTT Mobile Communications Network, Inc., Japan

[21] Appl. No.: 08/696,939

[22] PCT Filed: Dec. 27, 1995

[86] PCT No.: PCT/JP95/02718

§ 371 Date: Aug. 23, 1996

§ 102(e) Date: Aug. 23, 1996

[87] PCT Pub. No.: WO96/20544

PCT Pub. Date: Jul. 4, 1996

[30] Foreign Application Priority Data

| Dec. 28, 1994 | [JP] | Japan | 6-328725 |
| May 17, 1995 | [JP] | Japan | 7-118603 |
| Jun. 13, 1995 | [JP] | Japan | 7-146381 |
| Oct. 4, 1995 | [JP] | Japan | 7-257644 |

[51] Int. Cl.⁶ .............. H04B 15/00; H04J 13/02
[52] U.S. Cl. ............ 370/320; 370/335; 370/342; 375/200
[58] Field of Search ............ 370/320, 335, 370/342, 503; 375/200, 362, 364

[56] References Cited

U.S. PATENT DOCUMENTS

| 5,204,876 | 4/1993 | Bruckert et al. | 375/200 |
| 5,631,922 | 5/1997 | Sekine et al. | 370/342 |
| 5,638,376 | 6/1997 | Miki et al. | 370/342 |
| 5,712,869 | 1/1998 | Lee et al. | 375/206 |
| 5,717,713 | 2/1998 | Natali | 370/342 |

FOREIGN PATENT DOCUMENTS

| 54-72615 | 6/1979 | Japan. |
| 3-88526 | 4/1991 | Japan. |
| 7-131381 | 5/1995 | Japan. |

*Primary Examiner*—Chi H. Pham
*Assistant Examiner*—Frank Duong
*Attorney, Agent, or Firm*—Rogers & Wells LLP

[57] ABSTRACT

A CDMA system capable of quickly establishing acquisition of a long code, a spreading code with a period considerably longer than a symbol length. The received phase of the long code is estimated by inserting an a priori code into a spread signal which is spread by the long code at a fixed interval, and by detecting the start timing of receiving the a priori code, where the a priori code has a correlation value of nearly zero with the long code, and an autocorrelation value of a triangular profile. Its transmitter has an a priori code inserting circuit, and its receiver has a replica generating circuit of the a priori code. In addition, the system includes a plurality of correlators for obtaining correlation values between the received signal and the replica of the a priori code, and a circuit for obtaining the maximum correlation values and their start timings of reception among these correlation values. It estimates the start timing of the a priori code from the start timings of reception that provides the maximum correlation values, and estimates the point separated by a fixed time from the estimated start timing to be the received phase of the long code.

26 Claims, 21 Drawing Sheets

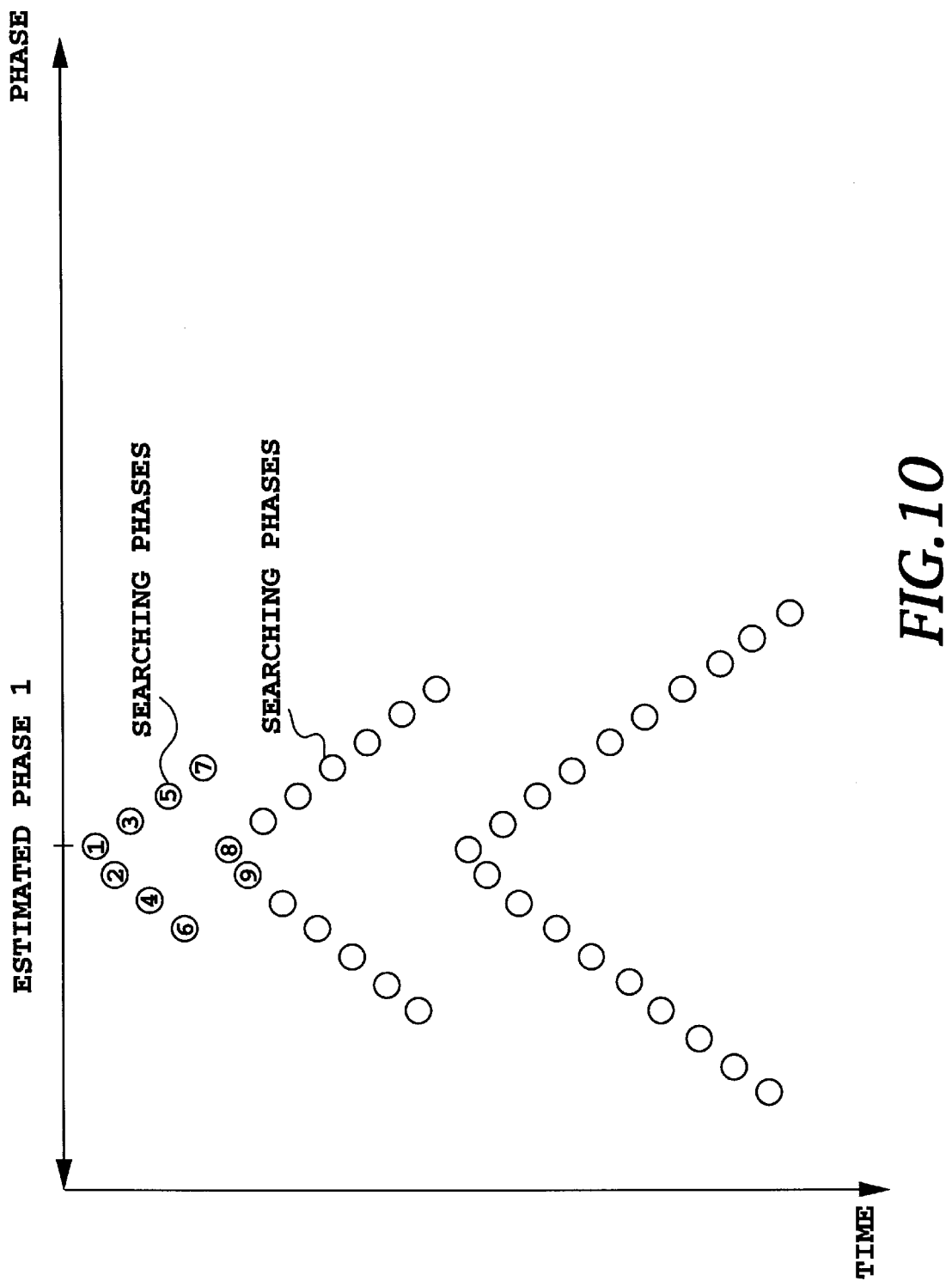

IN PHASE COMPONENT OF
CORRELATION BETWEEN
RECEIVED SIGNAL AND
A PRIORI CODE (I CORRELATION)

APPARATUS AND METHOD FOR ESTABLISHING ACQUISITION OF SPREADING CODE IN CDMA TRANSMISSION SYSTEM

TECHNICAL FIELD

The present invention relates to an apparatus and method for establishing acquisition of a spreading code in a CDMA transmission system which carries out multiple access by using spread spectrum in a mobile communications system.

BACKGROUND ART

In a direct sequence (DS) CDMA transmission, information data is transmitted after it undergoes a primary modulation, followed by a secondary modulation which spreads the primary modulated signal with a high rate spreading signal. At a receiving side, the wideband received signal (spread signal) is first converted into the original narrow-band signal through a process called despreading, and then undergoes a usual demodulation. The despreading at the receiving side is carried out by detecting correlation between the received signal and a replica of the spreading code synchronized in phase with the spreading code in the received signal. Accordingly, it is necessary for recovering the information data to synchronize the spreading code replica with the spreading code in the received signal.

The synchronization roughly falls into two processes: acquisition and tracking. The acquisition captures the phase difference between the received spreading code and the spreading code replica within a range sufficiently narrower than ± one chip because the autocorrelation of a quadrature code used as the spreading code can usually be obtained only within ± one chip. Then, the tracking keeps the phase difference between the two codes within this range. Since the present invention relates only to the acquisition, a conventional acquisition method will be described below.

The acquisition of the spreading code is generally carried out as follows: First, the correlation between the received signal and the spreading code replica is taken by multiplying the two codes, and by integrating the product for one spreading code period. Next, the establishment of the acquisition is decided by square-law detecting the correlation output followed by deciding whether or not the detection output exceeds a threshold. Since the phase of the carrier is not synchronized between the transmission side and the reception side, it is difficult to know the phase of the carrier before despreading. Thus, the non coherent method is used in which the effect of the carrier phase is removed by square-law detecting the correlated and integrated signal before performing the threshold decision.

The correlation of the acquisition can usually be detected using a sliding correlator carrying out time integral, or a matched filter performing space integral. The matched filter is an FIR filter (transversal filer) having the tap number corresponding to the processing gain and using the spreading code as tap coefficients. Since the matched filter achieves the correlation detection between the spreading code in the received signal and the spreading code replica at once by using the space integral, the acquisition is achieved in a fraction of time. However, the matched filter has taps whose number corresponds to the processing gain. In addition, the correlation detection must be performed at a rate at least twice the chip rate because it is necessary for the matched filter to adjust its sampling timing at a peak position with the band-limited received signal. Thus, the matched filter requires the tap number twice the processing gain, which presents a shortage that its circuit scale becomes larger than that of the sliding correlator.

The present invention relates to the acquisition of a long code with a very long period as compared with an information symbol, and hence it is considered very difficult to realize by using the matched filter. Thus, the acquisition with the sliding correlator will be considered in connection with the present invention.

The correlation is calculated between the spreading code replica and the received signal including noise, and the correlation output undergoes an envelope detection through a square-law detector. The detected output is integrated for a dwell time τ in an integral & dump circuit. The integrated output undergoes threshold processing. Although the sliding correlation method is simple in circuit configuration, it has a shortage that it takes a long time for the acquisition.

In the CDMA applied to a cellular, control information is exchanged between a base station and a mobile station through a control channel before a traffic channel is established for transmitting information data represented by voice. Generally speaking, an increasing period of spreading code will provide a greater number of the spreading codes, thereby increasing the number of multiplexing, although a time taken for the acquisition grows longer because of an increase in phase uncertainty. Taking account of this characteristic, a method is proposed in which a short code is used for a control channel and a long code is applied to a traffic channel by superimposing it over the short code, the short code having a period equal to one symbol interval of the information data, and the long code having a much longer period than the information data symbol. In this method, the acquisition of the control channel is achieve using the short code, and that of the traffic channel is carried out by inserting phase information on the starting position of the long code in the control channel. Thus, the acquisition of the traffic channel is started from a state in which the chip phase is nearly synchronized between the base station and the mobile station. As a result, the acquisition of both channels can be established in a short time.

This method, however, presents a problem in that it employs a short code in the control channel. Spreading the control channel with the short code will substantially restrict the number of the control channel because the number of the quadrature codes is determined by the code length. When assigning the limited number of the control channels, spreading code management is required in connection with the control channel. To avoid such management, an increasing number of control channel is required, in which case, it is necessary to increase the code length of the control channels to some extent. Thus, it is also required for the control channel to use spreading codes with a period longer than one symbol period of the information data. In this case, speed up of the acquisition becomes important.

DISCLOSURE OF THE INVENTION

An object of the present invention is to provide an apparatus and method for establishing acquisition of a spreading code in a CDMA transmission system which can establish the acquisition in a short time in the direct sequence CDMA transmission system using a long code.

In a first aspect of the present invention, there is provided a transmitter in a CDMA transmission system comprising:

long code generating means for generating a long code which is a spreading code with a period longer than information symbol;

spreading means for generating a wideband spread signal by spreading transmission information using the long code;

a priori code generating means for generating a priori code representing a phase of the long code, a cross-correlation between the a priori code and the long code being negligibly small;

a priori code insertion means for inserting the a priori code into the spread signal at a predetermined fixed interval to form frames; and transmission means for transmitting the frames.

Here, the a priori code may comprise smoothly changing autocorrelation values, and a zero-cross point.

The autocorrelation values of the a priori code may have a triangular profile.

The a priori code may have a stepwise profile.

The a priori code may have a period shorter than the long code.

The a priori code insertion mean may insert the a priori code into the spread signal within a predetermined range at a beginning of communications.

The a priori code generating mean may comprise means for generating a predetermined code for a convolution, and calculation means for carrying out the convolution between the code for a convolution and the long code to output the a priori code, and the a priori code insertion means may insert an output of the calculation means into the spread signal.

In a second aspect of the present invention, there is provided an acquisition apparatus in a CDMA system which demodulates desired information by receiving a received signal including a spread signal and an a priori code, the spread signal being spread by a long code which is a spreading code with a period longer than information symbol, the a priori code having a negligibly small cross-correlation with the long code, and representing a phase of the long code, the acquisition apparatus comprising:

first correlation means for generating a replica of the long code, and for calculating a correlation between the received signal and the replica of the long code;

second correlation means for generating a replica of the a priori code, and for calculating a correlation between the received signal and the replica of the a priori code;

phase estimation means for estimating received phase of the long code based on an output of the second correlation means; and means for controlling a generation phase of the replica of the long code based on an output of the phase estimation means.

Here, the a priori code may be inserted into the spread signal at a fixed period, wherein the second correlation means may comprise paired correlators consisting of a correlator that generates replicas of paired a priori codes consisting of a replica of a first a priori code and a replica of a second a priori code with their correlation detection start timings shifted by an amount of $\Delta$, and that calculates correlations between the replica of the first a priori code and the received signal, and a correlator that calculates correlations between the replica of the second a priori code and the received signal; and the phase estimation means may estimate a received phase of the long code based on outputs of the paired correlators.

Each of the paired correlators may integrate a product of the received signal and the replica of the a priori code for one period of the a priori code; and the phase estimation means may estimate a received phase of the long code from two integrated values.

The second correlation means may comprise m pairs of correlators, where m is an integer greater than one, wherein start timings of correlation detection and integration of adjacent pairs of the correlators are shifted by $T_A/m$ in time, where $T_A$ is a length of the a priori code.

The phase estimation means may comprise means for selecting one pair of the correlators which produces maximum outputs, and may estimate a received phase of the long code based on the maximum outputs and their detection timings.

The phase estimation means may obtain a zero-cross point, at which a correlation value between the received signal and the replica of the a priori code becomes zero, from the maximum outputs and their detection timings, and may estimate a received phase of the a priori code from the zero-cross point, and the control means may control a generation phase of the replica of the long code in accordance with the estimated received phase of the a priori code.

The control means may set the generation phase of the replica of the long code such that the generation phase is centered at the received phase of the a priori code estimated by the phase estimation means, and may carry out non-uniform search in which the generation phase of the replica of the long code is gradually shifted in a wider range when a phase of the replica of the long code is not synchronized with a phase of the long code in the received signal.

The a priori code may be inserted solely at an initial portion of the spreading code.

The a priori code may be inserted solely at an initial portion of the spreading code of a control channel.

The first correlation means may be a sliding correlator.

The second correlation means may comprise an I-correlator and a Q-correlator, the I correlator detecting correlation between an I-component (inphase component) of a carrier of the received signal after quadrature detection and an I-component of the replica of the a priori code, the Q-correlator detecting correlation between a Q component (quadrature component) of the carrier of the received signal after quadrature detection and a Q-component of the replica of the a priori code, wherein the phase estimation means may estimate a received phase of the long code using both the I-component and the Q-component.

The phase estimation means may obtain a complex amplitude of an output of the I correlator and an output of the Q-correlator, and may estimate the received phase of the long code using the complex amplitude.

The phase estimation means may compare an output of the I-correlator with an output of the Q-correlator, and may estimate the received phase of the long code using the output with a greater absolute value.

The phase estimation means may obtain an estimated received phase of the long code from an output of the I-correlator, and an estimated received phase of the long code from an output of the Q-correlator, and may estimate the received phase of the long code by averaging these two estimated received phases.

In a third aspect of the present invention, there is provided a receiver in a CDMA system which demodulates desired information by receiving a received signal including a spread signal and an a priori code, the spread signal being spread by a long code which is a spreading code with a period longer than information symbol, the a priori code having a negligibly small cross-correlation with the long code, and representing a phase of the long code, the receiver comprising:

first correlation means for generating a replica of the long code, and for calculating a correlation between the received signal and the replica of the long code;

second correlation means for generating a replica of the a priori code, and for calculating a correlation between the received signal and the replica of the a priori code;

phase estimation means for estimating received phase of the long code based on an output of the second correlation means; and means for controlling a generation phase of the replica of the long code based on an output of the phase estimation means.

In a fourth aspect of the present invention, there is provided a CDMA transmission system comprising:

long code generating means for generating a long code which is a spreading code with a period longer than information symbol;

spreading means for generating a wideband spread signal by spreading transmission information using the long code;

a priori code generating means for generating a priori code representing a phase of the long code, a cross-correlation between the a priori code and the long code being negligibly small;

a priori code insertion means for inserting the a priori code into the spread signal at a predetermined fixed interval to form frames;

transmission means for transmitting the frames;

receiving means for receiving the frames;

first correlation means for generating a replica of the long code, and for calculating a correlation between a received signal and the replica of the long code;

second correlation means for generating a replica of the a priori code, and for calculating a correlation between the received signal and the replica of the a priori code;

phase estimation means for estimating received phase of the long code based on an output of the second correlation means; and means for controlling a generation phase of the replica of the long code based on an output of the phase estimation means.

In a fifth aspect of the present invention, there is provided a transmission method in a CDMA transmission system comprising the steps of:

generating a long code which is a spreading code with a period longer than information symbol;

generating a wideband spread signal by spreading transmission information using the long code;

generating a priori code representing a phase of the long code, a cross-correlation between the a priori code and the long code being negligibly small;

inserting the a priori code into the spread signal at a predetermined fixed interval to form frames; and transmitting the frames.

In a sixth aspect of the present invention, there is provided an acquisition method of a spreading code in a CDMA system which demodulates desired information by receiving a received signal including a spread signal and an a priori code, the spread signal being spread by a long code which is a spreading code with a period longer than information symbol, the a priori code having a negligibly small cross-correlation with the long code, and representing a phase of the long code, the acquisition method comprising the steps of:

generating a replica of the long code;

calculating a correlation between the received signal and the replica of the long code;

generating a replica of the a priori code;

calculating a correlation between the received signal and the replica of the a priori code;

estimating received phase of the long code based on the correlation between the received signal and the replica of the a priori code; and controlling a generation phase of the replica of the long code based on an estimated received phase of the long code.

In a seventh aspect of the present invention, there is a CDMA transmission method comprising the steps of:

generating a long code which is a spreading code with a period longer than information symbol;

generating a wideband spread signal by spreading transmission information using the long code;

generating a priori code representing a phase of the long code, a cross-correlation between the a priori code and the long code being negligibly small;

inserting the a priori code into the spread signal at a predetermined fixed interval to form frames;

transmitting the frames;

receiving the frames;

generating a replica of the long code;

calculating a correlation between the received signal and the replica of the long code;

generating a replica of the a priori code;

calculating a correlation between the received signal and the replica of the a priori code;

estimating received phase of the long code based on the correlation between the received signal and the replica of the a priori code; and controlling a generation phase of the replica of the long code based on an estimated received phase of the long code.

BRIEF DESCRIPTION OF THE DRAWINGS

FIGS. 5A–5C are waveform diagrams illustrating a method for generating an a priori code by convolution, wherein FIG. 5A illustrates the waveform of a spreading code, FIG. 5B illustrates the waveform of a convolution code X, and FIG. 5C illustrates a waveform of the a priori code;

FIG. 10 is a schematic diagram illustrating the sequences for setting estimation phases in a non-uniform search;

BEST MODE FOR CARRYING OUT THE INVENTION

The invention will now be described with reference to the accompanying drawings.

EMBODIMENT 1

Figure 1:
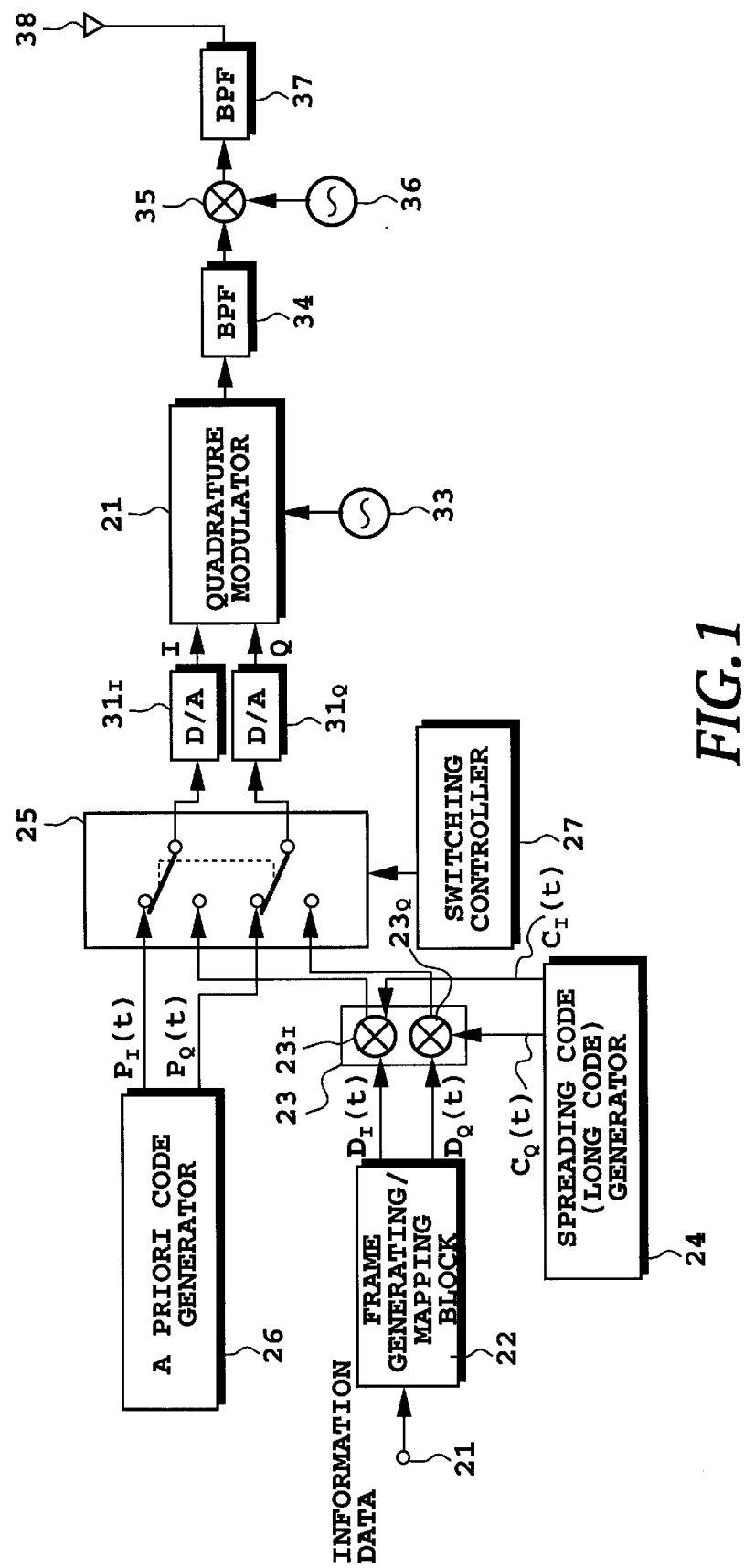
FIG. 1 is a block diagram showing a configuration of a transmitter of a first embodiment of a CDMA system in accordance with the present invention.

FIG. 1 is a block diagram showing the configuration of a transmitter of a CDMA transmission system in accordance with the present invention.

Figure 2:
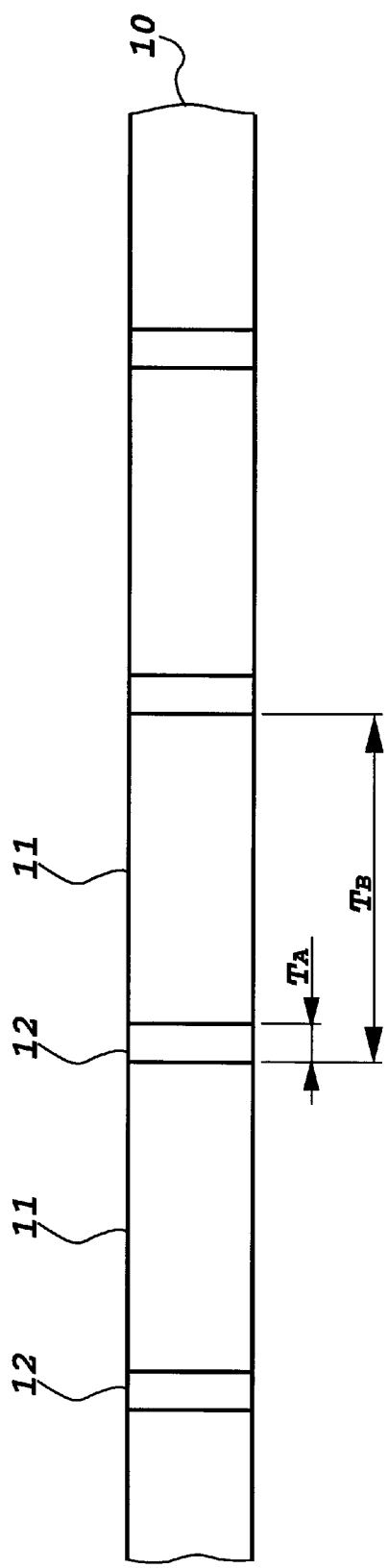
FIG. 2 is a schematic diagram showing a transmission frame consisting of a spread signal and an a priori code in accordance with the present invention.

The transmitter generates a frame as shown in FIG. 2, and transmits it.

In FIG. 2, a frame 10 is formed by inserting an a priori code 12 at a fixed interval $T_B$ into long code spread sections 11 spread by a long code. Here, the a priori code 12 is information used to estimate the received phase of the long code, and the length of the a priori code is about 10 symbol periods. The length of the long code spread section 11, on the other hand, is equal to the long code period of about 1,000 symbol periods. These lengths can be set rather arbitrarily. In the description below, the length of the a priori code 12 is termed a priori code length $T_A$, and the combination of the a priori code 12 and the long code spread section 11 is called an a priori block, whose period $T_B$ is referred to as an a priori period.

Figure 3A:
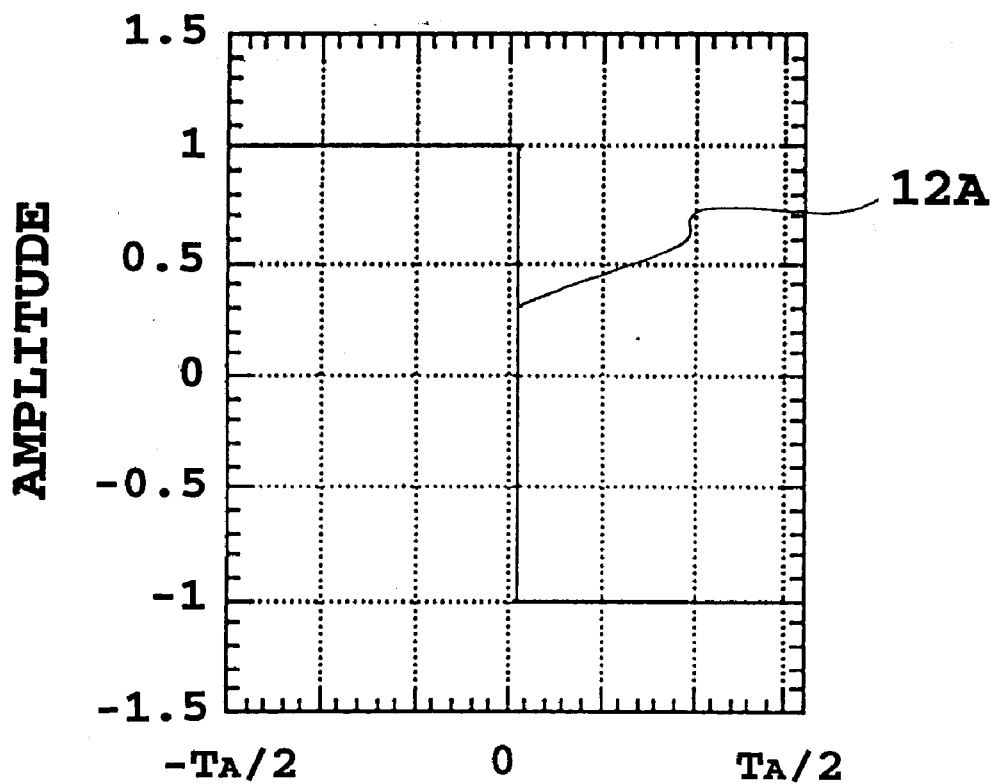
FIGS. 3A and 3B are graphs each illustrating an example of the a priori code, and its autocorrelation and correlation with a spreading code.
Figure 3B:
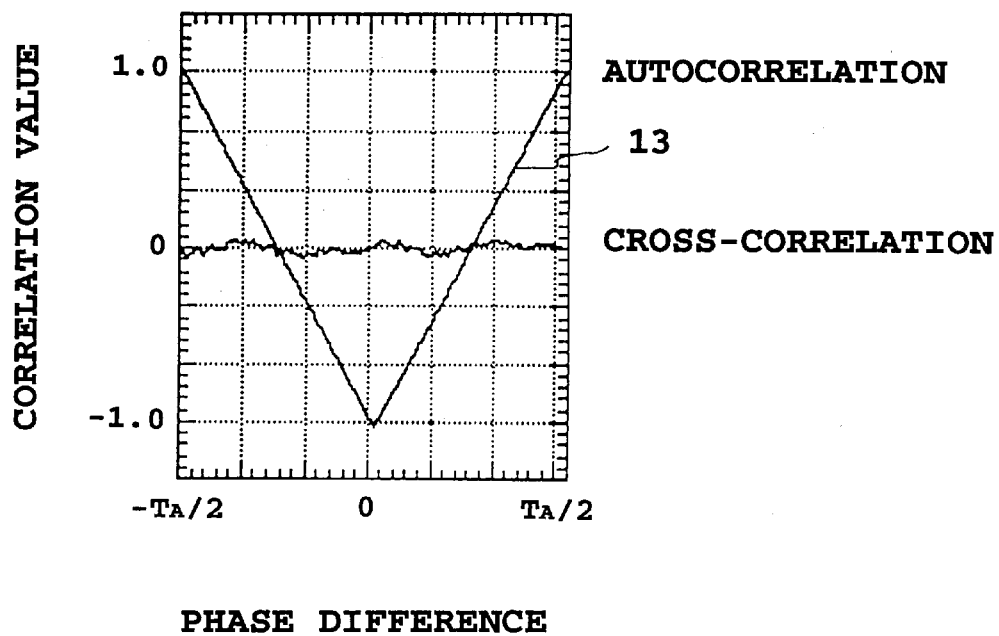

FIG. 3A illustrates an a priori code 12A with a step profile, and FIG. 3B illustrates its autocorrelation and cross-correlation with the long code. As shown in FIG. 3B, the autocorrelation value of the a priori code 12A has a triangular profile 13, and its cross correlation value with the long code is suppressed to nearly zero. Therefore, connecting the a priori code 12A and the long code into frames in a fixed phase relationship to be transmitted, and detecting the autocorrelation value of the a priori code 12A at the receiving side makes it possible to detect the position of the a priori code 12A.

Figure 4A:
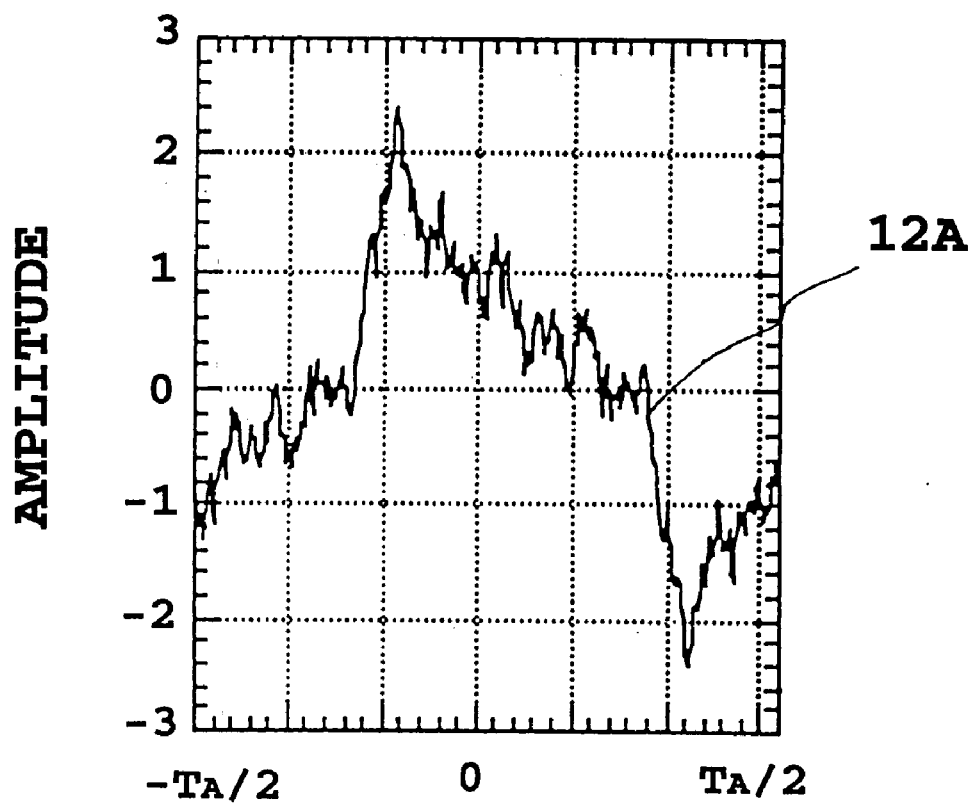
FIGS. 4A and 4B are graphs each illustrating another example of the a priori code, and its autocorrelation and correlation with a spreading code.
Figure 4B:
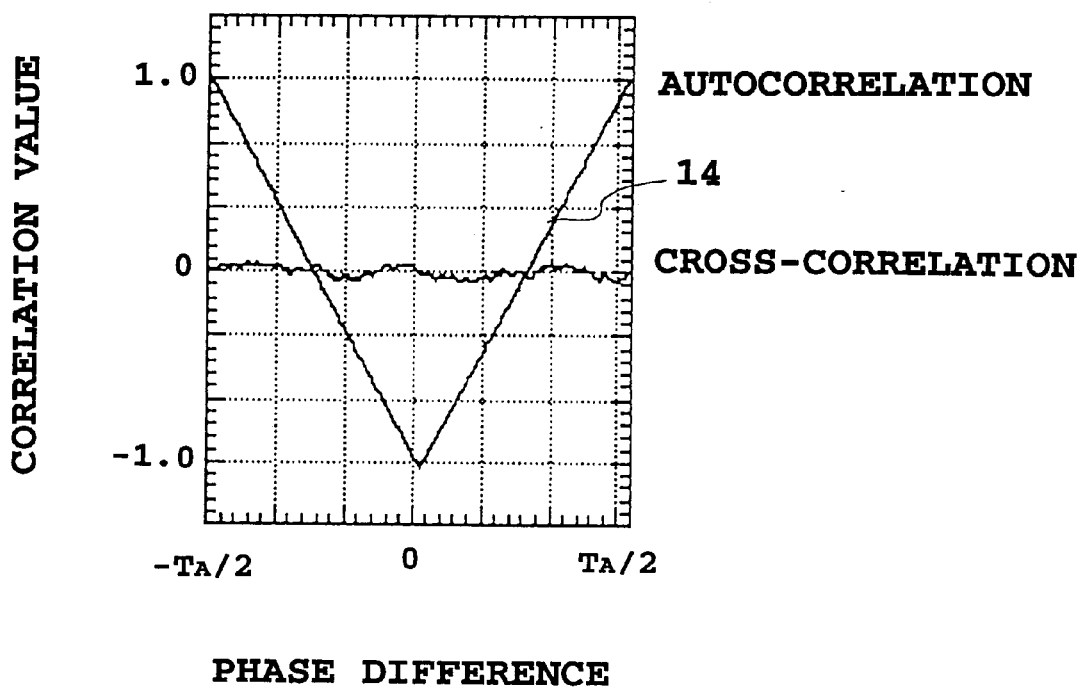

FIG. 4A illustrates another a priori code 12B, and FIG. 4B illustrates its autocorrelation and cross-correlation with the long code. As shown in FIG. 4B, the autocorrelation value of the a priori code 12B has a triangular profile 14 as in FIG. 3B, and its correlation value with the long code is suppressed nearly to zero.

Figure 5A:
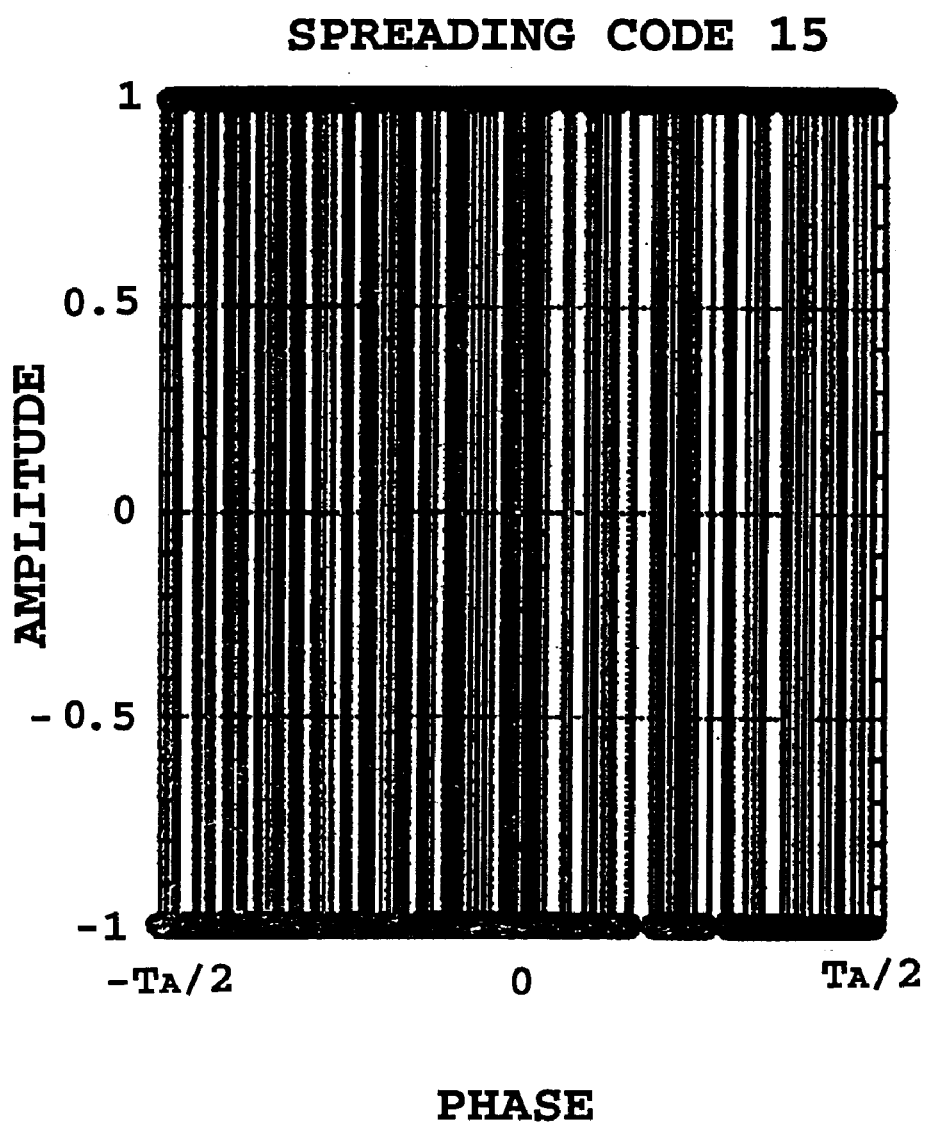
Figure 5B:
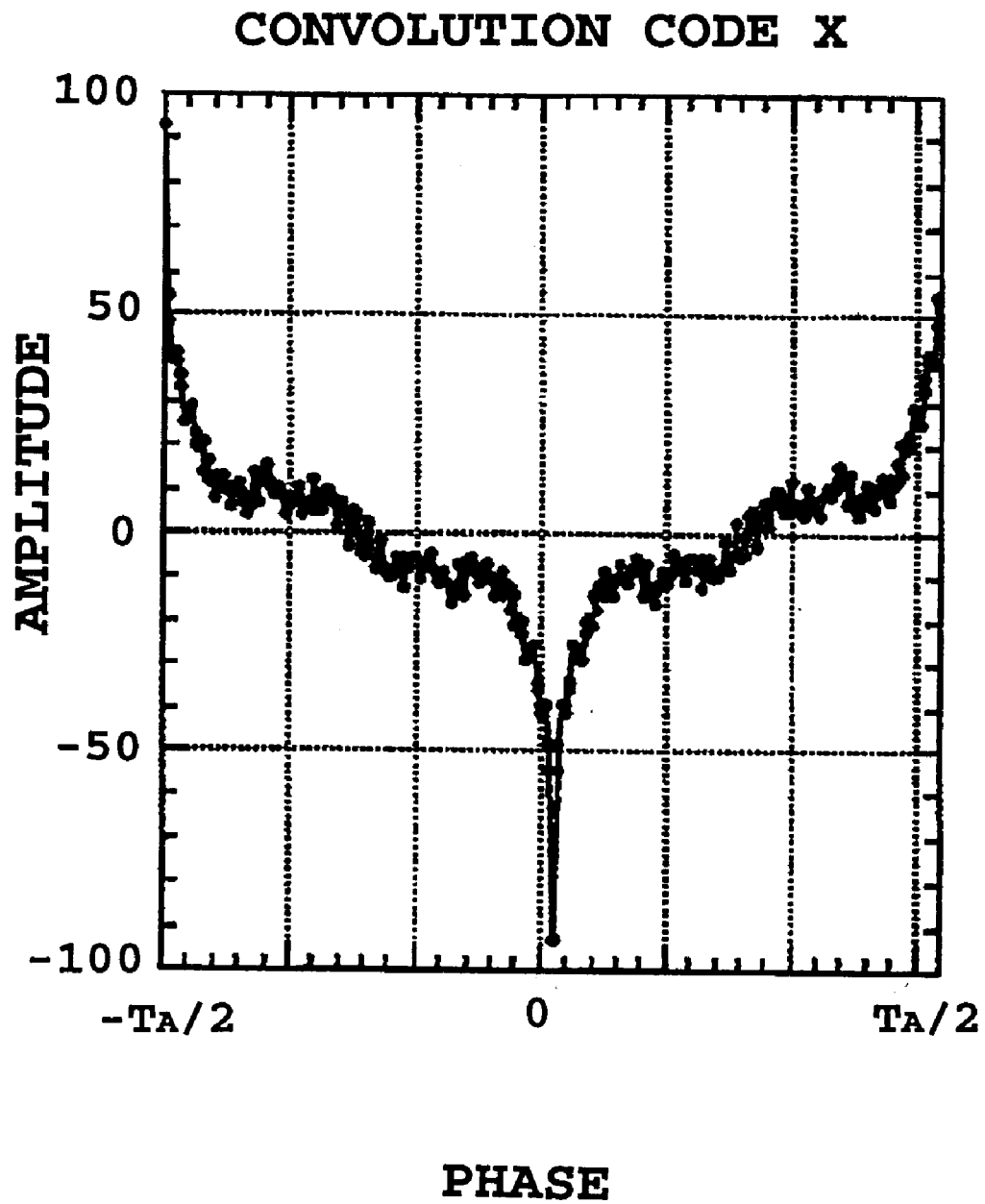
Figure 5C:
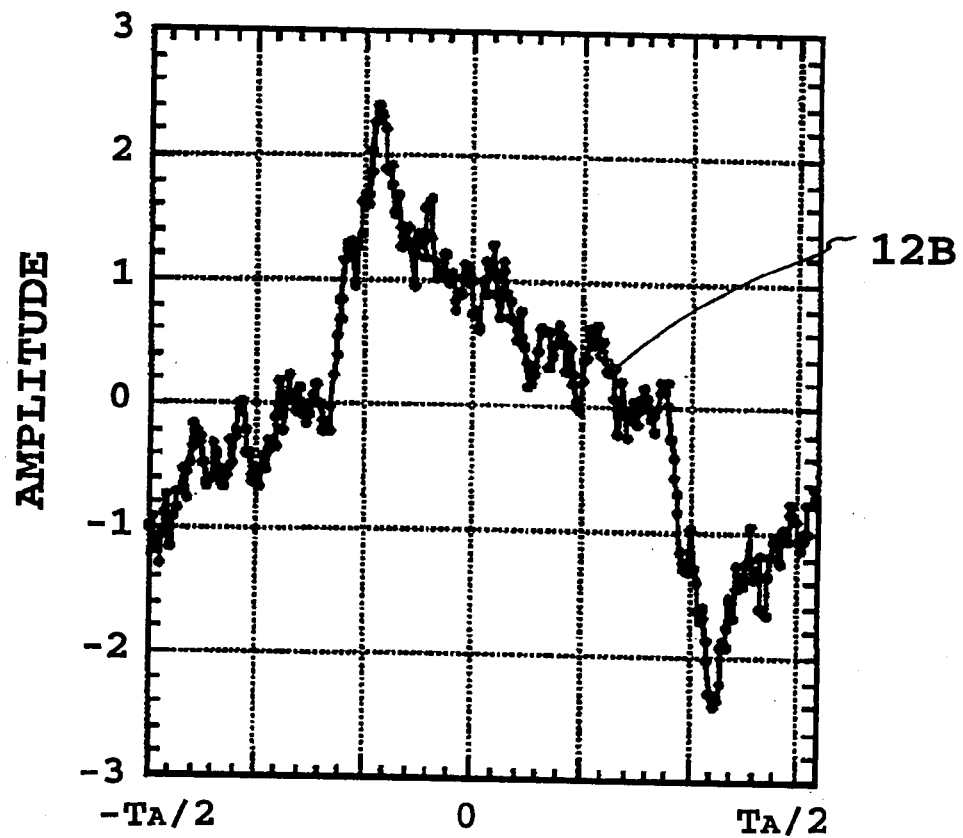

FIGS. 5A–5C illustrate a method for generating the a priori code 12B. The a priori code 12B as shown in FIG. 5C can be obtained by taking a convolution between the code X with a period $T_A$ as shown in FIG. 5B and a spreading code 15 with a period TA as shown in FIG. 5A. The convolution is a well-known operation.

Returning to FIG. 1, transmission information fed to an input terminal 21 of the transmitter is supplied to a frame generating/mapping block 22. The frame generating/mapping block 22 makes frames from the transmission information, and carries out mapping in accordance with a modulation method. The inphase component $D_I(t)$ and the quadrature component $D_Q(t)$ of the transmission information output from the generating/mapping block 22 are fed to multipliers $23_I$ and $23_Q$ in a code spreader 23.

On the other hand, the inphase component $C_I(t)$ and the quadrature component $C_Q(t)$ of the long code as a spreading code, are supplied to the multipliers $23_I$ and $23_Q$ from a long code generator 24, respectively. The multiplier $23_I$ multiplies the transmission information $D_I(t)$ by the long code $C_I(t)$, and the multiplier $23_Q$ multiplies the transmission information $D_Q(t)$ by the long code $C_Q(t)$. By this, the transmission information is spread by the long code, and the long code spread section 11 in FIG. 2 is generated. The generated long code spread section 11 is fed to a signal switch 25.

On the other hand, the inphase component $P_I(t)$ and quadrature component $P_Q(t)$ of the a priori code generated by an a priori code generator 26 is directly fed to the signal switch 25 from the a priori generator 26. The signal switch 25 switches the a priori code 12 and the long code spread section 11 in accordance with a switching signal from a switch controller 27 to provide D/A converters $31_I$ and $31_Q$ with the frame 10 of the format as shown in FIG. 2.

The transmission information (spread signal) supplied to the D/A converters $31_I$ and $31_Q$ is fed to a quadrature modulator 21 after converted into analog signals. The quadrature modulator 21 carries out quadrature modulation of the carrier signal, which is supplied from an oscillator 33, by the spread signal. The quadrature modulated spread signal is band-limited by a BPF (Band-Pass Filter) 34, and is fed to a frequency converter 35. The frequency converter 35 performs frequency conversion of the quadrature modulated spread signal by a signal from a local oscillator 36, and its output is band-limited by the BPF 37, and is transmitted from an antenna 38.

Figure 6:
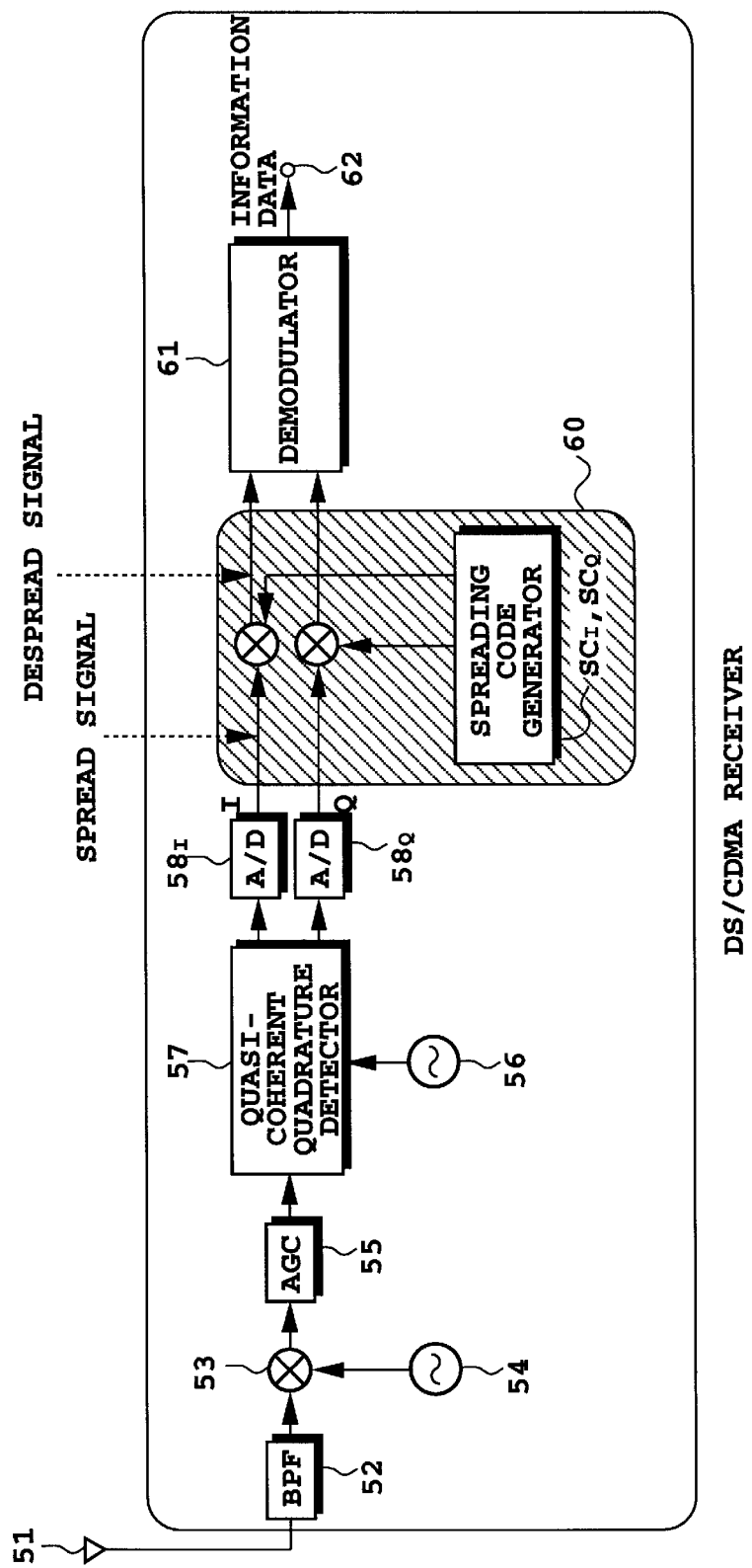
FIG. 6 is a block diagram showing the configuration of a receiver of the first embodiment of the CDMA system in accordance with the present invention.

FIG. 6 is a block diagram showing the entire configuration of a receiver of the CDMA transmission system in accordance with the present invention. The radio wave received by an antenna 51 is band-limited by a BPF 52 to such a degree that a desired received signal is not distorted. The band-limited received signal is mixed by a mixer 53 with a local signal from a local oscillator 54 to be frequency converted. The frequency converted signal is corrected to a normal level by an AGC (Automatic Gain Controller) 55. The BPF 52 is inserted to ensure the normal operation of the AGC 55.

Next, the received signal undergoes quasi-coherent quadrature detection by a quasi-coherent quadrature detector 57 using a local signal from a local oscillator 56, the local signal having the same frequency as the carrier of the received signal. The output of the quasi-coherent quadrature detector 57 is converted into digital spread signals by A/D converters $58_I$ and $58_Q$. The spread signals are despread by a despreader 60, thereby deriving the desired signal. The despread signal is demodulated by a demodulator 61, and the desired information is output from an output terminal 62.

Figure 7:
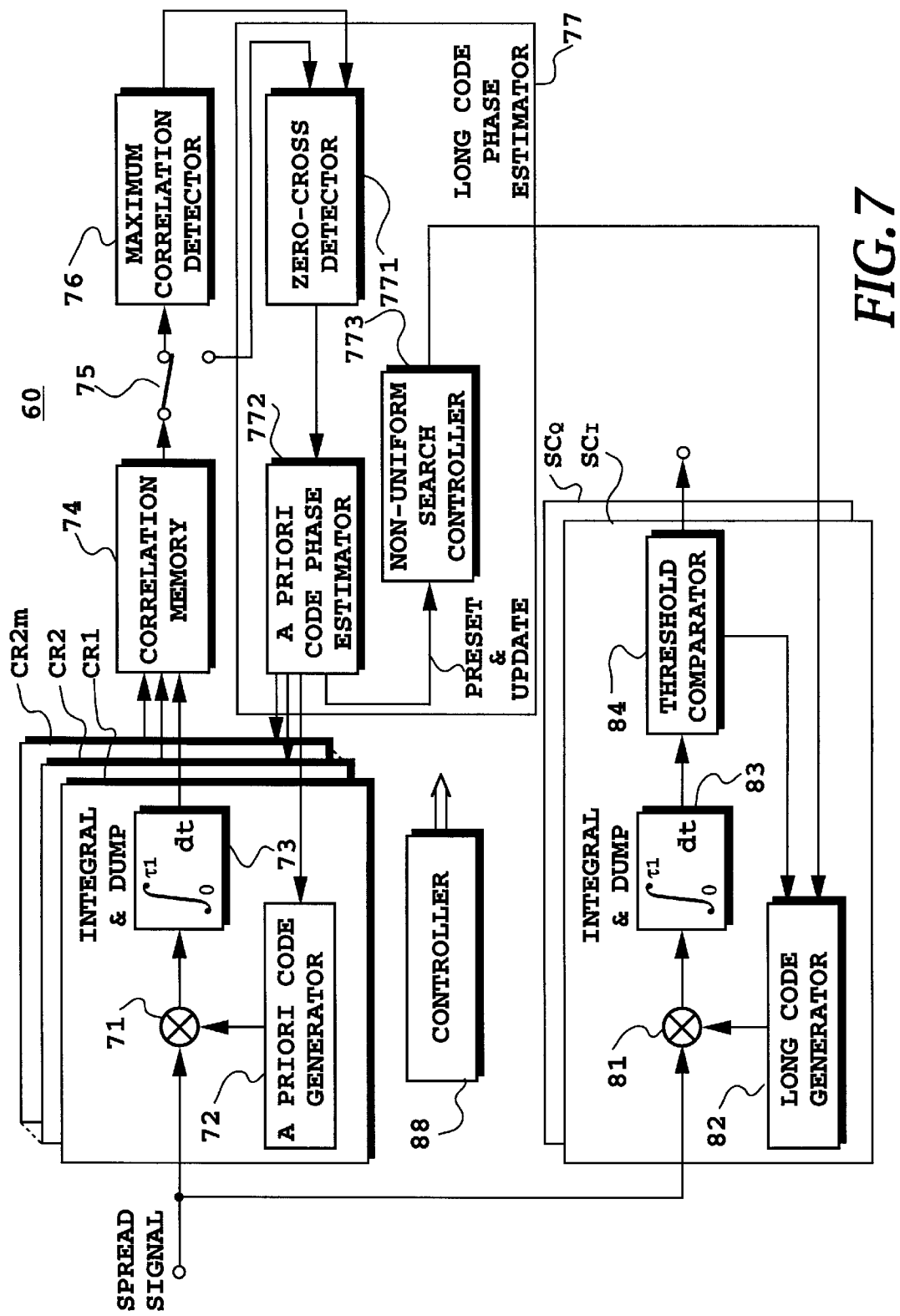
FIG. 7 is a block diagram showing the internal configuration of a despreader in the receiver shown in FIG. 6.

FIG. 7 is a block diagram showing a configuration of the despreader 60. The digital spread signal from the A/D converter $58_I$ is supplied to multipliers 71 of correlators $CR_1$–$CR_{2m}$, and at the same time to a multiplier 81 of a sliding correlator $SC_I$. On the other hand, the digital spread signal from the A/D converter $58_Q$ is fed to a multiplier 81 of a sliding correlator $SC_Q$. The two sliding correlators $SC_I$ and $SC_Q$ function as a spreading code generator. Each multiplier 71 multiplies the spread signal by a replica of the a priori code supplied from the a priori code generator 72, and provides the product to an integral & dump circuit 73. The integral & dump circuit 73 integrates the product over one a priori code length $T_A$. The multiplier 71, the a priori code generator 72 and the integral & dump circuit 73 constitute the correlator $CR_k$ (k=1–2m). The despreader of FIG. 7 comprises m pairs of correlators $CR_1$, $CR_2$, ..., $CR_{2m}$. The two correlators in each pair have correlation detection (integration) start timings which are shifted by $\Delta$. For example, the correlation detection (integration) start timings of the paired correlators $CR_1$ and $CR_2$ are shifted by $\Delta$. In addition, the correlation detection (integration) start timings of adjacent pairs of correlators are shifted by $T_A/m$. For example, the correlation detection (integration) start timings of the adjacent pairs of correlators $CR_1$ and $CR_3$ are shifted by $T_A/m$.

The 2m correlation values are stored in a correlation memory 74 together with the correlation detection timings of the correlation values. Here, the correlation detection timings mean the integration start timings in respective correlators. The $mT_B/T_A$ pairs of correlation values and the correlation detection timings stored in the correlation memory 74 are supplied to a maximum correlation detector 76 and a long code phase estimator 77 via a switch 75. The switch 75 is connected to the maximum correlation detector 76 in a received phase estimation mode of the long code, which will be described later, and to the long code phase estimator 77 in the received phase detection mode of the long code. The maximum correlation detector 76 selects the greatest correlation values in the $mT_B/T_A$ pairs of correlation values, and supplies the long code estimator 77 with two correlation values $R_1$ and $R_2$ of the pair of correlators associated with the maximum correlation values, and the correlation detection timings $t_1$ and $t_2$ of these correlation values.

The long code phase estimator 77 comprises a zero-cross detector 771, an a priori code phase estimator 772 and a non uniform search controller 773. The zero-cross detector 771 detects a point at which a straight line connecting two points $(R_1, t_1)$ and $(R_2, t_2)$ zero-crosses. The a priori code phase estimator 772 estimates the start timing of receiving the a priori code from the zero-cross point to control the oscillation phase of respective a priori code generators 72. The non-uniform search controller controls the oscillation phase of a long code generator 82 such that its phase is centered on the estimated received phase of the long code derived from the receiving start timing estimated by the a priori code phase estimator 772. Details of these operations will be described later.

On the other hand, the spread signal supplied to each multiplier 81 is multiplied by a replica of the long code from the long code generator 82 to obtain their correlation values. The correlation values are integrated by an integral & dump circuit 83 over one symbol interval, and are fed a threshold comparator 84. The threshold comparator 84 compares the correlation values with a predetermined threshold value, and shifts the oscillation phase of the long code generator 82 as shown in FIG. 10 when the correlation values are smaller than the threshold value, and keeps the oscillation phase when the correlation values are equal to or greater than the threshold. These elements 81–84 constitute the sliding correlator $SC_l$.

The controller 88 controls respective portions described above. For example, it controls the switching timings of the switch 75. The operation of the controller 88 will be described later with reference to FIGS. 11A and 11B.

Figure 8:
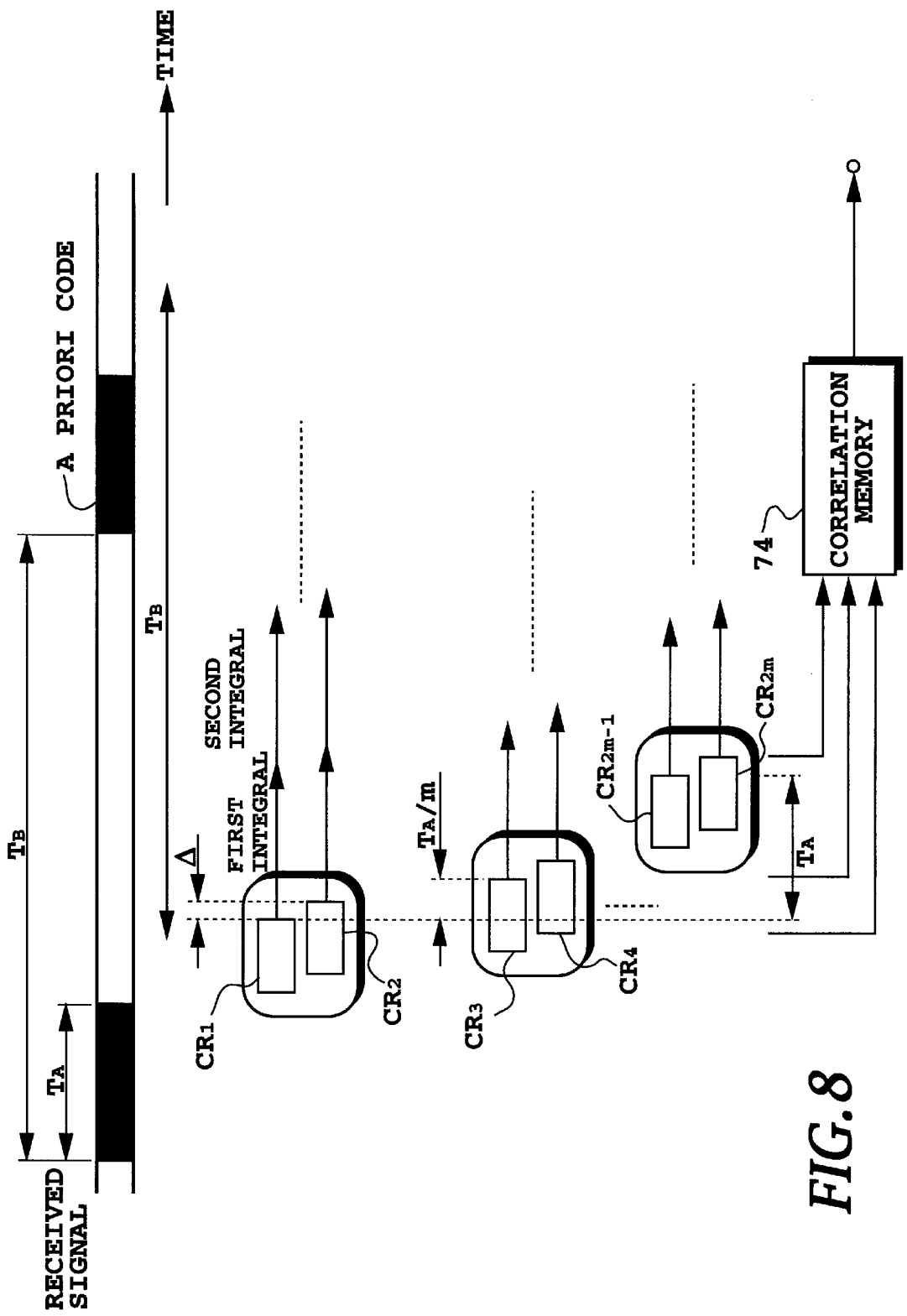
FIG. 8 is a schematic diagram illustrating timing relationships between paired correlators and a received signal.

FIG. 8 is a schematic diagram illustrating relationships between the paired correlators $CR_k$ (k=1–2m) and the received signal (spread signal). Each correlator $CR_k$ integrates the correlation value between the a priori code replica and the received signal over one a priori code length $T_A$, and outputs the integration value and the correlation detection timing every $T_A$ interval. The output values are stored in the correlation memory 74. In this case, the start timings of the integration is shifted by a small amount. That is, the start timings of the two correlators of the same pair are shifted by $\Delta$, and the start timings of the counterpart correlators in the adjacent pairs are shifted by $T_A/m$. Here, typical values of $\Delta$ and m are $T_A/4$ and 4, respectively. The correlation detection is carried out over at least one a priori period $T_B$, and usually for several a priori periods. Then, the maximum correlation values are obtained from the pair of correlators which provides the correlation detection timings closest to the start timing of receiving the a priori code 12. Thus, the start timing of receiving the a priori code 12 can be estimated from the correlation values output from the pair of correlators with their integration phase shifted.

Figure 9:
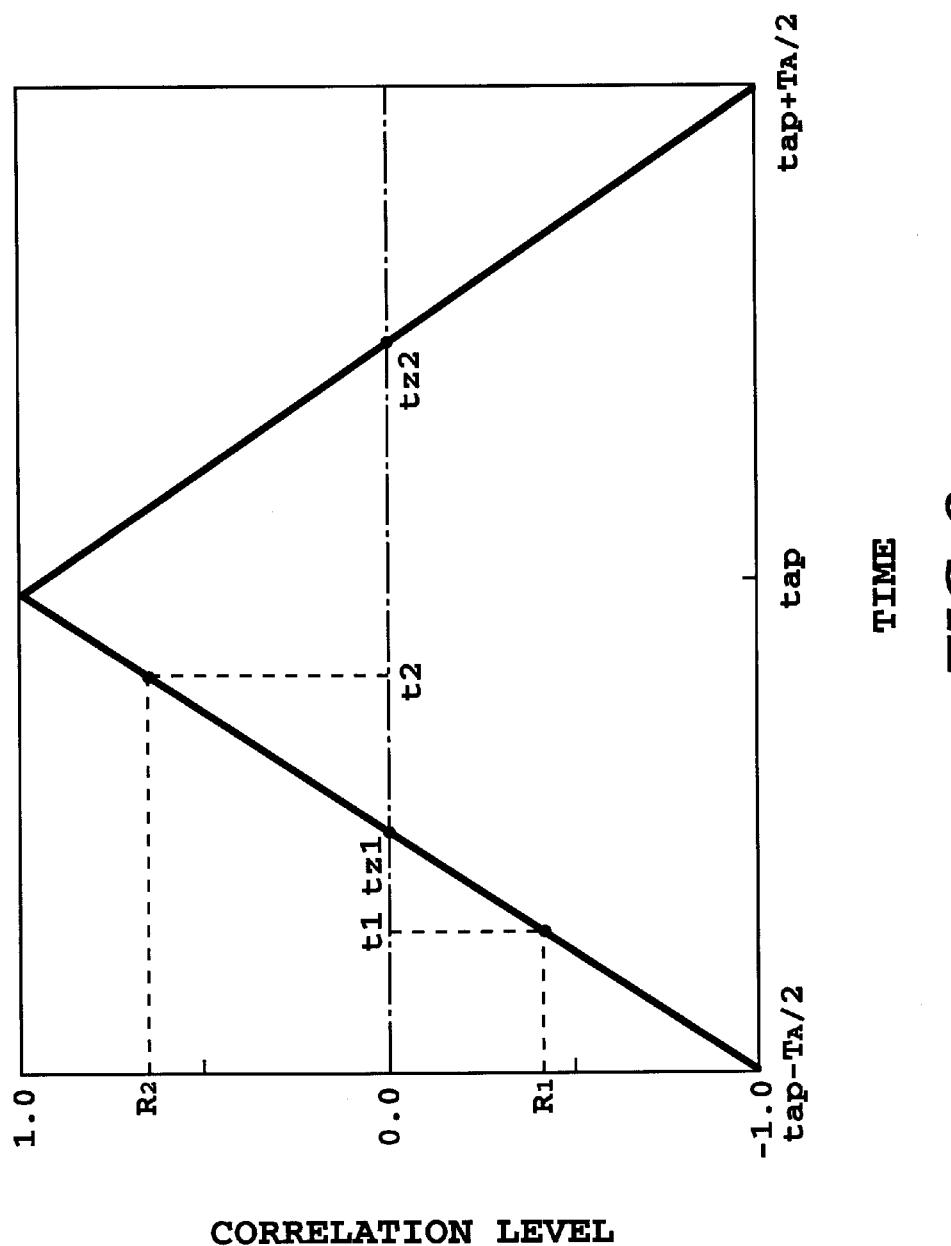
FIG. 9 is a graph illustrating a method for estimating the start timing of receiving the a priori code on the basis of maximum correlation outputs $R_1$ and $R_2$ of the paired correlators and their detection timings $t_1$ and $t_2$.

FIG. 9 is a graph illustrating a method for estimating the start timing $t_{ap}$ of receiving the a priori code 12 from the maximum correlation values $R_1$ and $R_2$, and their detection timings $t_1$ and $t_2$. In FIG. 9, the axis of abscissas represents time and the axis of ordinates represents the correlation level between the received signal and the replica of the a priori code 12. The length of the axis of abscissas equals the a priori code length $T_A$, and its middle point tap represents the start timing of receiving the a priori code. In addition, $t_1$ and $t_2$ indicate the detection timings of the correlation values $R_1$ and $R_2$, that is, the start timings of the integration by the correlators. When the start timings of the integration coincide with the start timings of receiving the a priori code (for example, when $t_1=t_{ap}$), the correlation level becomes maximum. In FIG. 9, it is shown that the start timings $t_1$ and $t_2$ of the integrations associated with the correlation values $R_1$ and $R_2$ precede the receiving timing of the a priori code by a small amount.

The zero-cross detector 771 is supplied with the maximum correlation values $R_1$ and $R_2$, and their detection timings $t_1$ and $t_2$ from the maximum correlation detector 76. The zero cross detector 771 obtains a zero-cross point $t_{z1}$ at which the straight line joining the two points $(t_1, R_1)$ and $(t_2, R_2)$ crosses the line of zero correlation level. This is for estimating the start timing of receiving the a priori code by utilizing the fact that the zero-cross point is hard to change in the fading environment. In this case, the following cases will occur in accordance with the positions of the correlation detection timings $t_1$ and $t_2$.

(1) When both $t_1$ and $t_2$ are either at the right-hand side or the left-hand side of the receiving start timing tap (in FIG. 9, both of them are present at the left-hand side), the zero-cross point can be obtained in the range of FIG. 9 by joining the two points. In other words, time differences between the zero-cross point and the correlation detection timings fall within $T_A/4$ in this case.

(2) When $t_1$ and $t_2$ are present at opposite sides with respect to the receiving start timing, the zero-cross point will go beyond the range of FIG. 9. In other words, the time difference between the zero-cross point and the correlation detection timings are above $T_A/4$ in this case.

The a priori code phase estimator 772 estimates the start timing of receiving the a priori code from the zero-cross point. That is, in case (1), it estimates the timing obtained by shifting the zero-cross timing by $T_A/4$ towards the greater correlation value to be the start timing $t_{ap}$ of receiving the a priori code. On the other hand, in case (2), it estimates the middle point of the two correlation detection timings $t_1$ and $t_2$ to be the starting timing $t_{ap}$ of receiving the a priori code.

The following is the reason for obtaining the zero-cross point before estimating the start timing of receiving the a priori code. On an actual propagation path, the correlation characteristics of the a priori code 12 are often inverted owing to fading on the path. The position at which the correlation value becomes zero, however, is fixed, and the correlation function is kept linear when the a priori code length $T_A$ is short as compared with the fading period, and hence the complex envelope of the fading during the correlation detection integration time can be considered to be constant. Thus, the start timing of receiving the a priori code can be obtained by the above-mentioned method.

FIG. 10 is a schematic diagram illustrating the searching method by the non-uniform search controller 773. In this figure, the axis of abscissas represents the phase of the long code, and the axis of ordinates represents the time. In addition, numbers in open circles designate search sequence. As shown in this figure, the non-uniform search controller begins with the estimated phase (that is, the start timing of receiving the a priori code), and controls the long code generator 82 so as to gradually widens its search range in both sides. This makes it possible to effectively detects the phase of receiving the long code. This searching method, called NUEA (Non-uniformly Expanded Alternate serial search strategy) is described in detail in V. M. Jovanovic, "Analysis of Strategies for Serial-Search Spread-Spectrum Code Acquisition-Direct Approach", IEEE Trans. on Communications, VOL. COM 36. No. 11, pp. 1208–1220, November 1988.

Figure 11A:
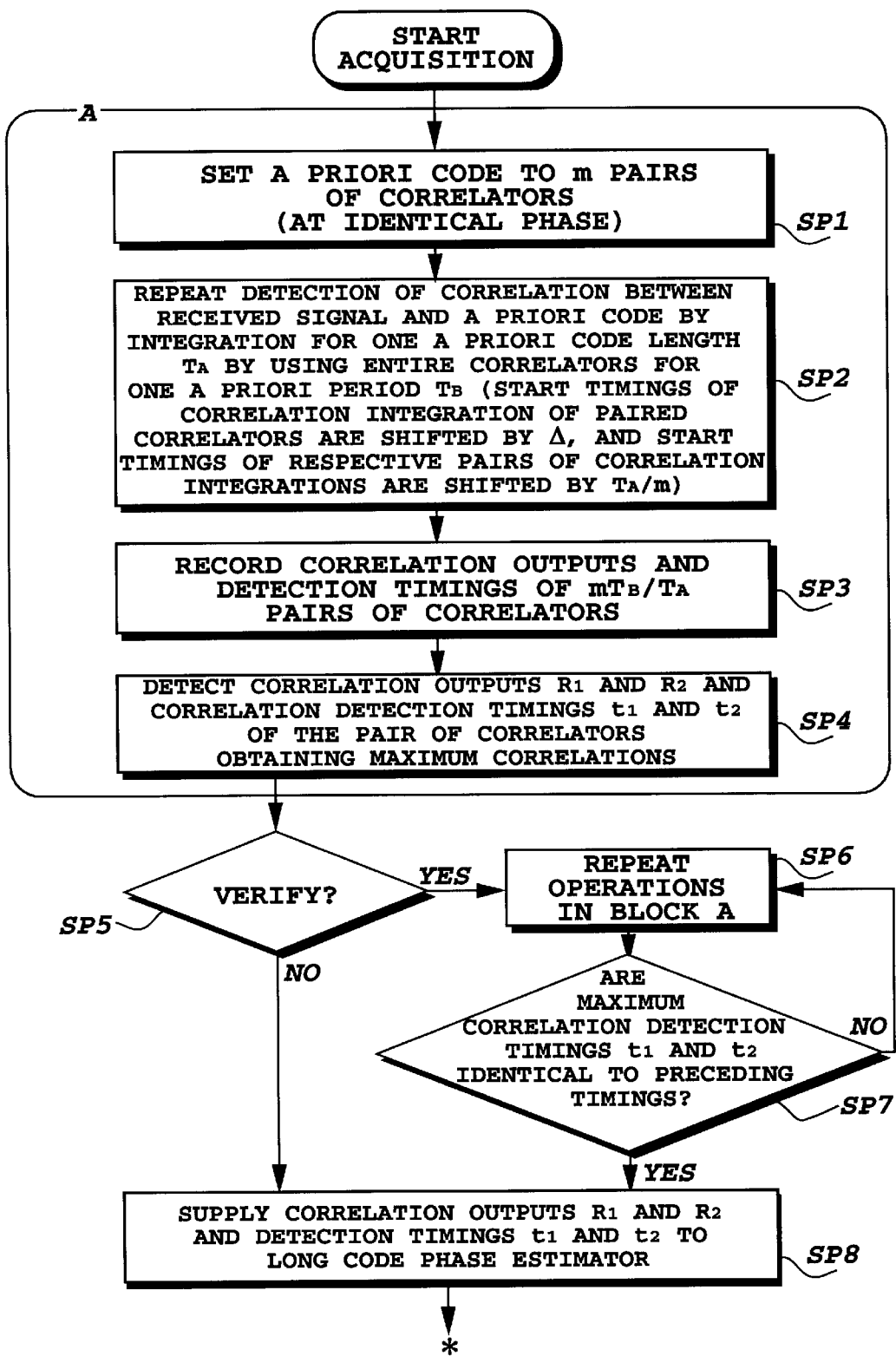
FIGS. 11A and 11B are flowcharts showing the operation of the first embodiment.
Figure 11B:
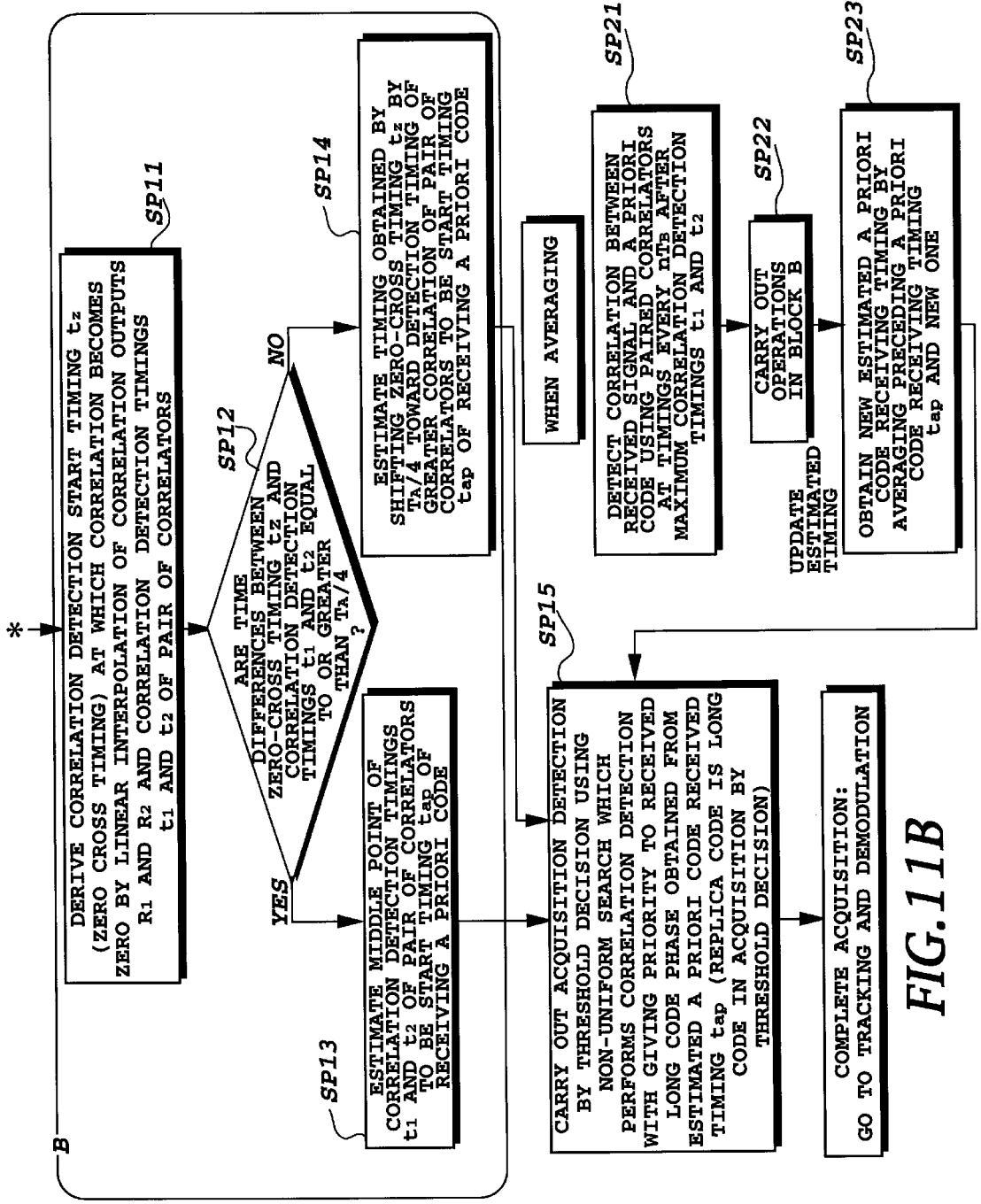

Next, the operation of the embodiment will be described with reference to FIGS. 11A and 11B.

Upon starting the acquisition, the controller 88 sets the a priori code in the 2m correlators $CR_k$ at step SP1. Specifically, the same a priori code is set in the a priori code generator 72 of each correlator at an identical phase. Then, the multipliers 71 of respective correlators $CR_1$–$CR_{2m}$ obtain correlation between the received signal and the a priori code replica as explained in FIG. 8. The resultant correlation values are fed to the integral & dump circuits 73, and are integrated over time $T_A$ (step SP2). This operation is continued for one a priori period TB to produce $T_B/T_A$ correlation values and correlation detection timings from the respective correlators. Thus, the total of $mT_B/T_A$ pairs of correlation values and correlation detection timings are obtained. These values are stored in the correlation memory 74 at step SP3.

The switch 75 is connected to the maximum correlation detector 76 at the start of the acquisition. Accordingly, the correlation values and the correlation detection timings stored in the memory 74 are fed to the maximum correlation detector 76. The maximum correlation detector 76 detects among these data the correlation values $R_1$ and $R_2$ and the correlation detection timings $t_1$ and $t_2$ of the pair of correlators that outputs the maximum correlation values (step SP4).

Next the controller 88 decides at step SP5 whether or not to verify the correlation values and the correlation detection timings by repeating the operations of steps SP1–SP4. When to verify, the process is moved to step SP6 to repeat the operations of steps SP1–SP4, that is, the operations in block A of FIG. 11A. Then, the controller 88 verifies whether the detection timings of the maximum correlation values are the same as the preceding one at step SP7. If they are different, the operations of block A is repeated at step SP6. If they are the same, the maximum correlation values $R_1$ and $R_2$, and their detection timings $t_1$ and $t_2$ are fed to the zero-cross detector 771 in the long code phase estimator 77.

The zero-cross detector 771 obtains the zero-cross point by a method as described in FIG. 9. More specifically, it obtains the zero-cross point $t_z$ by the linear interpolation of the two points $(R_1, t_1)$ and $(R_2, t_2)$ derived from the correlation values $R_1$ and $R_2$ and their detection timings $t_1$ and $t_2$. The a priori code phase estimator 772 compares $t_1$ with $t_z$, and $t_2$ with $t_z$ at step SP12 to decide whether these differences are equal to or greater than $T_A/4$. If at least one of the differences is equal to or greater than $T_A/4$, the a priori code phase estimator 772 estimates the middle point of the times $t_1$ and $t_2$ to be the start timing $t_{ap}$ at step SP13. On the other hand, if both the differences are less than $T_A/4$, the a priori code phase estimator 772 estimates a timing obtained by shifting the zero-cross point $t_z$ towards the greater correlation value $R_2$ by an amount $T_A/4$ to be the start timing tap of receiving the a priori code at step SP14. Thus, the a priori code phase estimator 772 outputs the estimated start timing $t_{ap}$ of receiving the a priori code. The received phase of the long code is estimated to be a point elapsed from the estimated start timing tap by a fixed time.

The non-uniform search controller 773 carries out the acquisition by controlling the sliding correlators $SC_I$ and $SC_Q$ using the non-uniform search as shown in FIG. 10. More specifically, the non-uniform search controller 773 initially sets the oscillation phase of the long code generator 82 at the estimated received phase of the long code, and shifts the phase of the long code replica in the sequence as shown in FIG. 10. During this, the threshold comparator 84 decides whether the correlation value exceeds the threshold value or not. When the correlation value exceeds the threshold, the long code generator 82 decides that the acquisition has been completed at the current oscillation phase.

Alternatively, when averaging the start timings $t_{ap}$ of receiving the a priori code by obtaining them several times, the controller 88 controls respective blocks to have them carry out steps SP21–SP23. Specifically, the correlation between the received signal and the a priori code replica is detected at timings $nT_B$ (n=1, 2, . . . ) after the maximum correlation detection timings at step SP22, and the operations in the block B of FIG. 11B, that is, steps SP11–SP14 are repeated at step SP22. After a plurality of estimated start timings of receiving the a priori code are obtained, the a priori code phase estimator 772 calculates their average to obtain a new start timing of receiving the a priori code at step SP23, followed by the operation at step SP15. Thus, the long code generator 82 completes the acquisition, and enters the tracking mode.

It is sufficient that the a priori code is inserted during a short time at the start of communications. As described before, when CDMA is applied to a cellular system, control information is exchanged between a base station and a mobile station through a control channel before establishing a traffic channel for transmitting information data represented by voice. Accordingly, it is possible to achieve the acquisition of the control channel using the a priori code, and to carry out the acquisition of the traffic channel by inserting information on the start phase of the long code in the control channel. This will make it possible to start the acquisition of the traffic channel from a state in which the chip phase of the long code is nearly synchronized between the base station and the mobile station. As a result, the acquisition of both channels can be established in a short time.

The a priori code generator 26 provided in the transmitter in this embodiment can be replaced with other means. For example, it is possible for a combination of a generator for generating the convolution code X as shown in FIG. 5B and a convolution calculator to generate the a priori code by calculating the convolution between the long code fed from the long code generator 24 and the code X.

EMBODIMENT 2

In the first embodiment described above, the received phase estimation of the long code uses only one of the correlation values of the inphase component (I-component) and the quadrature component (Q-component) of the received signal. In this case, effect of noise can increase owing to the state of complex envelopes of fading, and this will degrade the estimation accuracy. The second embodiment is proposed to ameliorate the estimation accuracy in the fading environment by carrying out phase estimation using both I- and Q-components, thereby making quick acquisition possible.

Figure 12A:
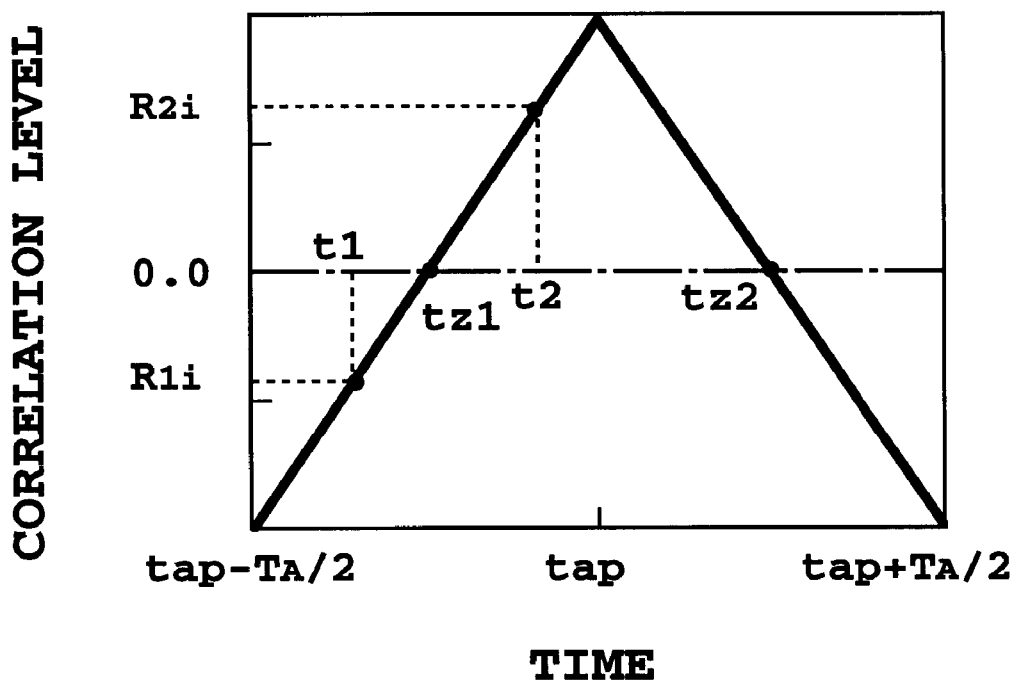
FIGS. 12A and 12B are graphs illustrating inphase and quadrature components of a correlation between a received signal and an a priori code.
Figure 12B:
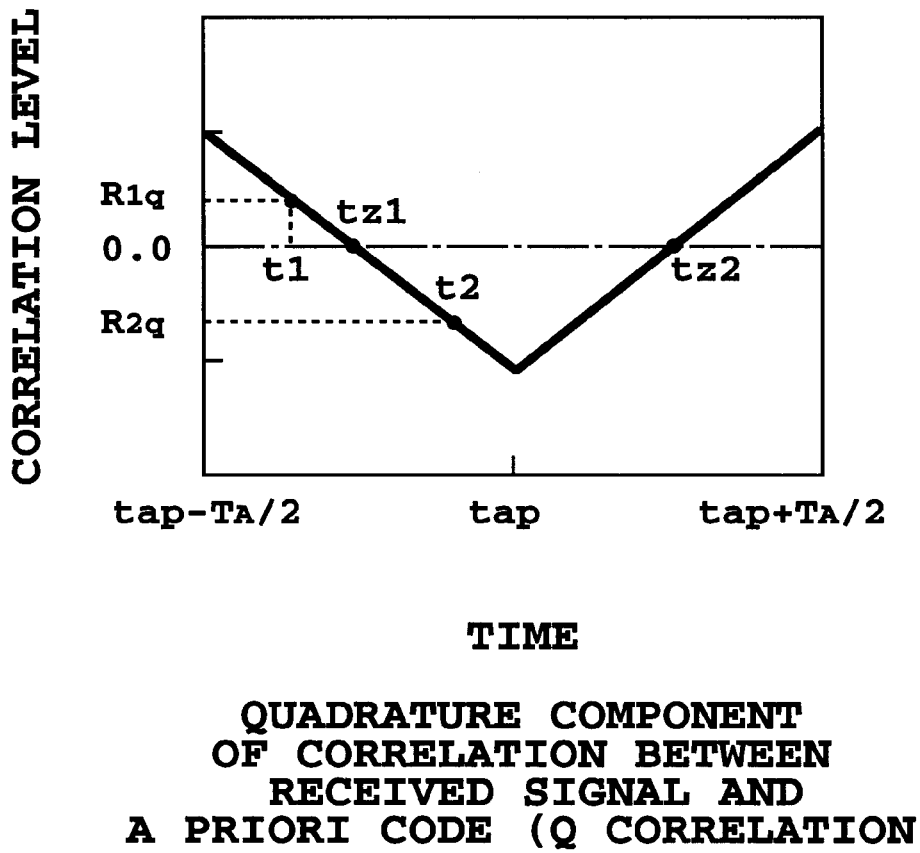

FIG. 12A shows the inphase component of the correlation value between the received signal and the a priori code replica, and FIG. 12B shows its quadrature component. In these figures, the axis of abscissas represents, in terms of time difference, the phase difference between the a priori code in the received signal and the a priori code replica generated by the a priori code generator 72. The time $t_{ap}$ designates the zero point of the time difference, at which the correlation level represented by the axis of ordinates becomes maximum. $R_{1i}$ and $R_{2i}$ represent the I components of the correlation values at times $t_1$ and $t_2$. Time $t_{z1}$ is a time of zero-cross point at which the correlation value becomes zero. FIG. 12B shows the correlation values $R_{1q}$ and $R_{2q}$ of the Q-component corresponding to the I-component.

The operation of the received phase estimator using the I- and Q- components will now be described with reference to FIGS. 13–15. In the following explanation, $L_i$ and $L_q$ represent the magnitude of the I and Q correlation values, respectively, which can be expressed by one of the following equations.

$$L_I = \begin{cases} R_{LI}^2 & (R_{LI}^2 \geq R_{2i}^2) \\ R_{2I}^2 & (R_{LI}^2 < R_{2i}^2) \end{cases}$$

$L_q$ can be expressed in a similar manner.

Figure 13:
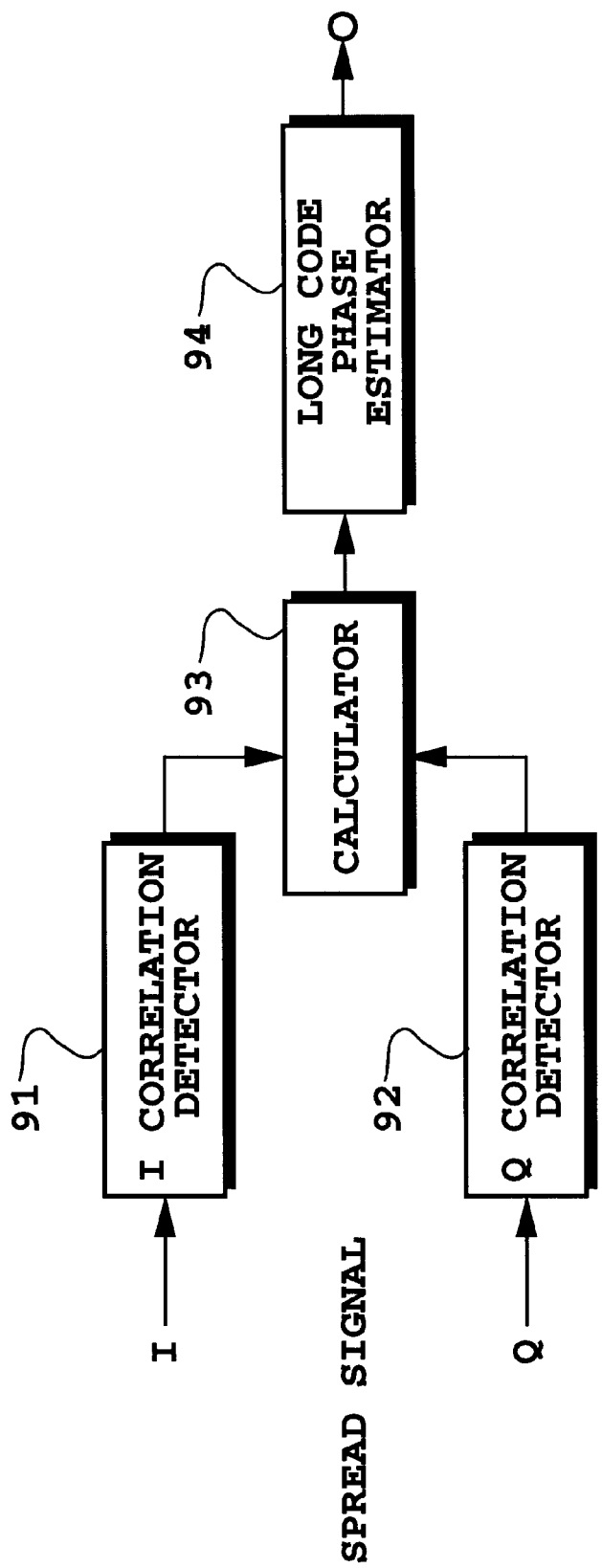
FIGS. 13–15 are block diagrams showing configurations of major portions of receivers in a CDMA system in accordance with the present invention.

FIG. 13 shows a configuration of a first phase estimator in accordance with the embodiment. In this figure, an I-correlation detector 91 corresponds to the circuit comprising the multiplier 71, the a priori code generator 72, the integral & dump circuit 73, the correlation memory 74, the switch 75 and the maximum correlation detector 76 as shown in FIG. 7. A Q-correlation detector 92 is similarly arranged. The I-correlation detector 91 is provided with the I-component of the spread signal from the A/D converter $58_I$ in FIG. 6, and the Q-correlation detector 92 is provided with the Q-component of the spread signal from the A/D converter $58_Q$. The outputs of the correlators 91 and 92 are fed to a calculator 93. The output of the calculator 93 is supplied to a long code phase estimator 94 which corresponds to the long code phase estimator 77 in FIG. 7.

With such an arrangement, the calculator 93 obtains complex amplitudes of correlation values from the I- and Q-correlation values supplied from the I- and Q-correlators 91 and 92, respectively, and provides the resultant values to the long code estimator 94. The sign of the greater amplitude of the I- and Q correlation values adopted as the sign of the correlation value. More specifically, the calculator 93 obtains two correlation values from the I-correlation values fed from the I-correlator 91 and the Q-correlation values fed from the Q-correlator 92 by the following expressions.

$$R_1 = sgn \begin{cases} R_{1i} & L_i \geq L_q \\ R_{1q} & L_i < L_q \end{cases} \sqrt{R_{1i}^2 + R_{1q}^2} \quad (1)$$

$$R_2 = sgn \begin{cases} R_{2i} & L_i \geq L_q \\ R_{2q} & L_i < L_q \end{cases} \sqrt{R_{2i}^2 + R_{2q}^2} \quad (2)$$

where sgn(a) represents the sign of a. The long code phase estimator 94 estimates the phase of the received long code using the resultant $R_1$ and $R_2$, and $t_1$ and $t_2$ as described in the first embodiment.

Figure 14:
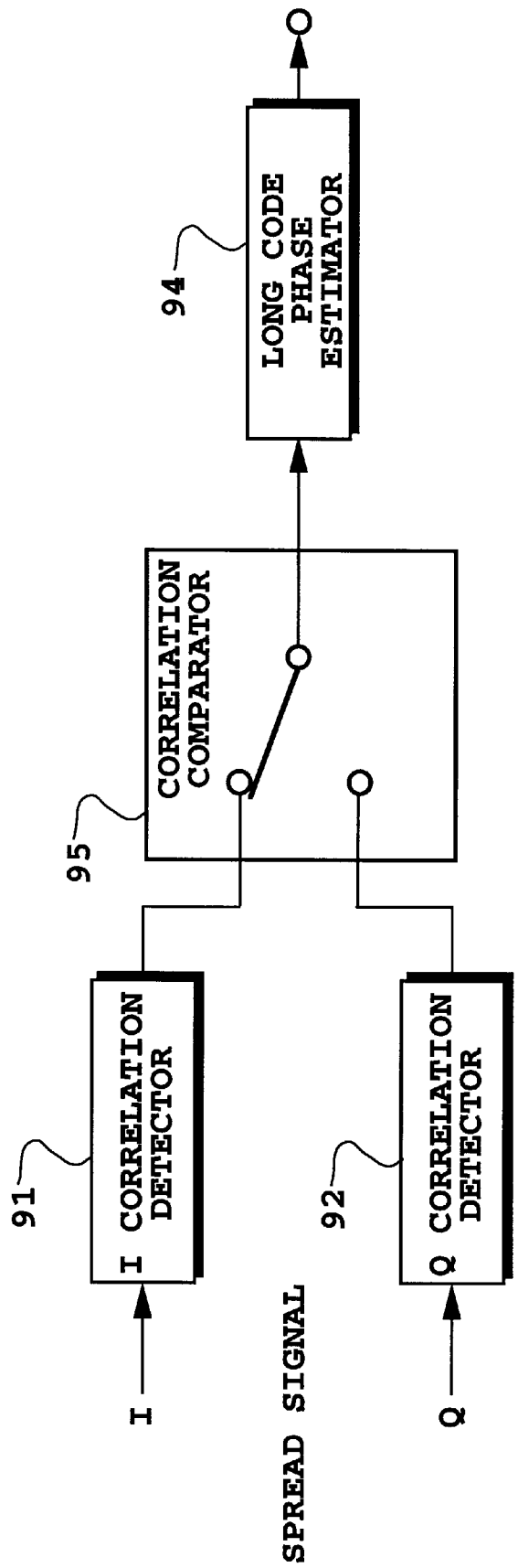

FIG. 14 shows a configuration of a second phase estimator of this embodiment. The system differs from that of FIG. 13 in that it uses a correlation comparator 95 instead of the calculator 93.

With this arrangement, the correlation comparator 95 is provided with the I-correlation values from the I-correlation detector 91 and the Q-correlation values from the Q-correlation detector 92. The correlation comparator 95 compares these two correlation values, and outputs the greater one. The long code phase estimator 94 estimates the phase of the received spread code using the greater correlation values. More specifically, it estimates the phase of the received spread code using $R_1$ and $R_2$, and $t_1$ and $t_2$ obtained by the following expressions.

$$R_1 = \begin{cases} R_{1i} & (L_i \geq L_q) \\ R_{1q} & (L_i < L_q) \end{cases} \quad (3)$$

$$R_2 = \begin{cases} R_{2i}, & (L_i \geq L_q) \\ R_{2q}, & (L_i < L_q) \end{cases} \quad (4)$$

Figure 15:
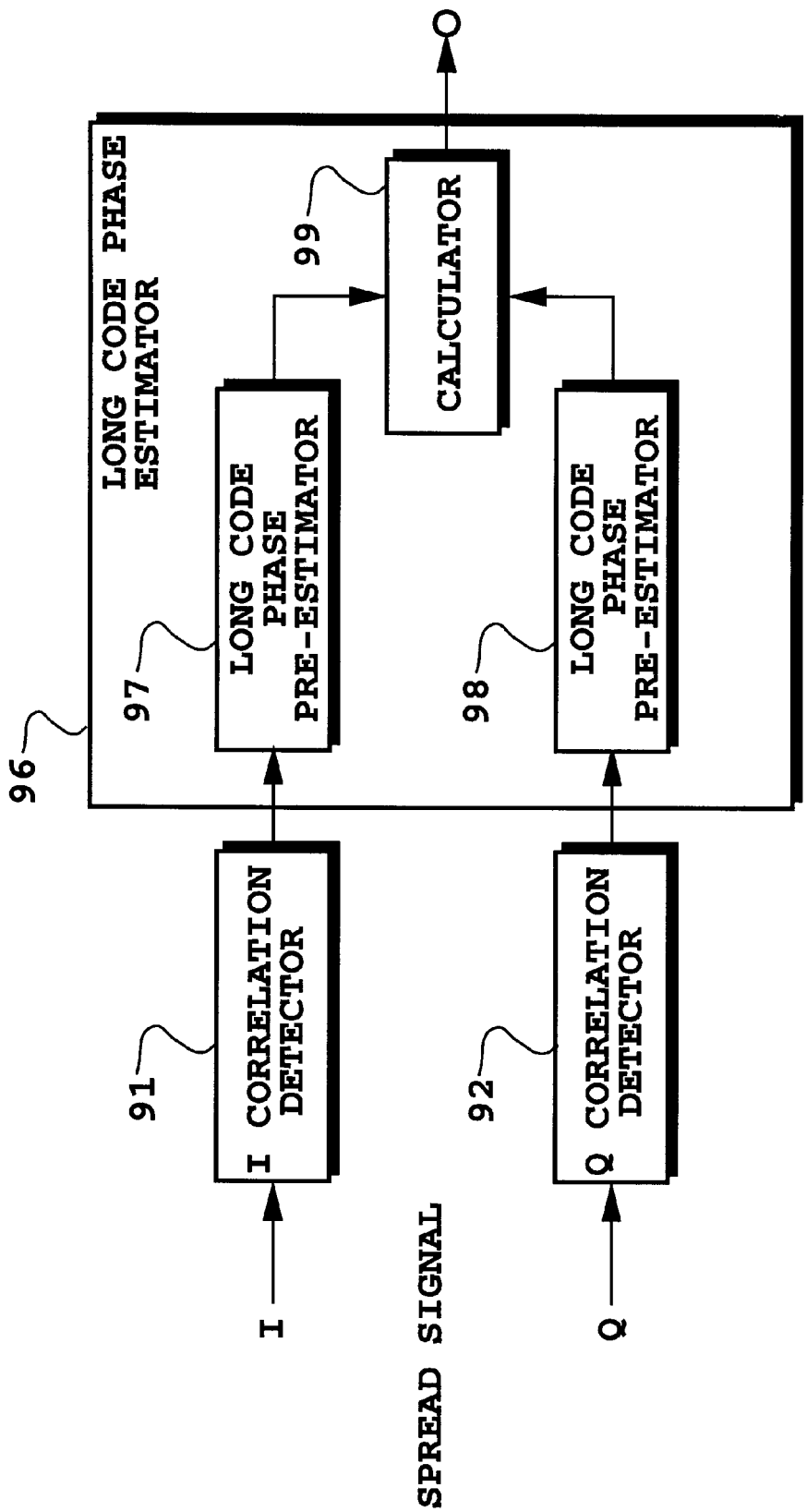

FIG. 15 shows a third phase estimator of the present embodiment. In FIG. 15, the I-correlator 91 and the Q-correlator 92 are connected to a long code phase estimator 96. The long code phase estimator 92 comprises two long code phase pre estimators 97 and 98, and a calculator 99.

With such an arrangement, the long code phase pre-estimators 97 and 98 estimate the phases for individual components using the I-correlation values fed from the I-correlator 91 and the Q correlation values fed from the Q-correlator 92.

There are two methods for combining the resultant two estimated phases: a simple averaging; and a weighted averaging in accordance with the respective correlation levels. Using the weighted averaging will provide a higher estimation accuracy. Assuming that $t_{api}$ represents the start timing of receiving the estimated a priori code obtained from the I-correlation values $R_{1i}$ and $R_{2i}$ and their detection timings $t_1$ and $t_2$, and that $t_{apq}$ represents the start timing of receiving the estimated a priori code obtained from the Q-correlation values $R_{1q}$ and $R_{2q}$ and their detection timings $t_1$ and $t_2$, the final start timing tap of receiving the estimated a priori code is obtained by the following expressions.

(1) When the simple averaging is used:

$$T_{ap} = \frac{T_{api} + T_{apq}}{2} \quad (5)$$

(2) When the weighted averaging is used:

$$T_{ap} = \frac{L_i \times t_{api} + L_q \times t_{api}}{L_i + L_q} \quad (6)$$

These operations are carried out by the calculator 99.

What is claimed is:

1. A transmitter in a CDMA transmission system comprising:

long code generating means for generating a long code which is a spreading code with a period longer than information symbol;

spreading means for generating a wideband spread signal by spreading transmission information using said long code;

a priori code generating means for generating a priori code representing a phase of said long code, a cross-correlation between said a priori code and said long code being negligibly small;

a priori code insertion means for inserting said a priori code into said spread signal at a predetermined fixed interval to form frames; and transmission means for transmitting said frames.

2. The transmitter in the CDMA transmission system as claimed in claim 1, wherein said a priori code comprises smoothly changing autocorrelation values, and a zero-cross point.

3. The transmitter in the CDMA transmission system as claimed in claim 1, wherein said autocorrelation values of said a priori code have a triangular profile.

4. The transmitter in the CDMA transmission system as claimed in claim 1, wherein said a priori code has a stepwise profile.

5. The transmitter in the CDMA transmission system as claimed in claim 1, wherein said a priori code has a period shorter than said long code.

6. The transmitter in the CDMA transmission system as claimed in claim 1, wherein said a priori code insertion means inserts said a priori code into said spread signal within a predetermined range at a beginning of communications.

7. The transmitter in the CDMA transmission system as claimed in claim 1, wherein said a priori code generating means comprises means for generating a predetermined code for a convolution, and calculation means for carrying out said convolution between said code for a convolution and said long code to output said a priori code, and said a priori code insertion means inserts an output of said calculation means into said spread signal.

8. An acquisition apparatus of a spreading code in a CDMA transmission system which demodulates desired information by receiving a received signal including a spread signal and an a priori code, said spread signal being spread by a long code which is a spreading code with a period longer than information symbol, said a priori code having a negligibly small cross-correlation with said long code, and representing a phase of said long code, said acquisition apparatus comprising:

first correlation means for generating a replica of said long code, and for calculating a correlation between said received signal and said replica of said long code;

second correlation means for generating a replica of said a priori code, and for calculating a correlation between said received signal and said replica of said a priori code;

phase estimation means for estimating received phase of said long code based on an output of said second correlation means; and means for controlling a generation phase of said replica of said long code based on an output of said phase estimation means.

9. The acquisition apparatus of the spreading code in the CDMA transmission system as claimed in claim 8, wherein said a priori code is inserted into said spread signal at a fixed period, and wherein said second correlation means comprises paired correlators consisting of a correlator that generates replicas of paired a priori codes consisting of a replica of a first a priori code and a replica of a second a priori code with their correlation detection start timings shifted by an amount of $\Delta$, and that calculates correlations between said replica of said first a priori code and said received signal, and a correlator that calculates correlations between said replica of said second a priori code and said received signal; and said phase estimation means estimates a received phase of said long code based on outputs of said paired correlators.

10. The acquisition apparatus of the spreading code in the CDMA transmission system as claimed in claim 9, wherein each of said paired correlators integrates a product of said received signal and said replica of said a priori code for one period of said a priori code; and said phase estimation means estimates a received phase of said long code from two integrated values.

11. The acquisition apparatus of the spreading code in the CDMA transmission system as claimed in claim 9, wherein said second correlation means comprises m pairs of correlators, where m is an integer greater than one, and wherein start timings of correlation detection and integration of adjacent pairs of said correlators are shifted by $T_A/m$ in time, where $T_A$ is a length of said a priori code.

12. The acquisition apparatus of the spreading code in the CDMA transmission system as claimed in claim 9, wherein said phase estimation means comprises means for selecting one pair of said correlators which produces maximum outputs, and estimates a received phase of said long code based on said maximum outputs and their detection timings.

13. The acquisition apparatus of the spreading code in the CDMA transmission system as claimed in claim 12, wherein said phase estimation means obtains a zero-cross point, at which a correlation value between said received signal and said replica of said a priori code becomes zero, from said maximum outputs and their detection timings, and estimates a received phase of said a priori code from said zero-cross point, and said control means controls a generation phase of said replica of said long code in accordance with the estimated received phase of said a priori code.

14. The acquisition apparatus of the spreading code of the CDMA transmission system as claimed in claim 8, wherein said control means sets the generation phase of said replica of said long code such that the generation phase is centered at the received phase of said a priori code estimated by said phase estimation means, and carries out non-uniform search in which the generation phase of said replica of said long code is gradually shifted in a wider range when a phase of said replica of said long code is not synchronized with a phase of said long code in said received signal.

15. The acquisition apparatus of the spreading code in the CDMA transmission system as claimed in claim 8, wherein said a priori code is inserted solely at an initial portion of said spreading code.

16. The acquisition apparatus of the spreading code in the CDMA transmission system as claimed in claim 8, wherein said a priori code is inserted solely at an initial portion of said spreading code of a control channel.

17. The acquisition apparatus of the spreading code in the CDMA transmission system as claimed in claim 8, wherein said first correlation means is a sliding correlator.

18. The acquisition apparatus of the spreading code in the CDMA transmission system as claimed in claim 8, wherein said second correlation means comprises an I-correlator and a Q-correlator, said I correlator detecting correlation between an I-component (inphase component) of a carrier of said received signal after quadrature detection and an I-component of said replica of said a priori code, said Q-correlator detecting correlation between a Q component (quadrature component) of the carrier of said received signal after quadrature detection and a Q-component of said replica of said a priori code, and wherein said phase estimation means estimates a received phase of said long code using both said I-component and said Q-component.

19. The acquisition apparatus of the spreading code in the CDMA transmission system as claimed in claim 18, wherein said phase estimation means obtains a complex amplitude of an output of said I correlator and an output of said Q-correlator, and estimates said received phase of said long code using the complex amplitude.

20. The acquisition apparatus of the spreading code in the CDMA transmission system as claimed in claim 18, wherein said phase estimation means compares an output of said I-correlator with an output of said Q-correlator, and estimates said received phase of said long code using the output with a greater absolute value.

21. The acquisition apparatus of the spreading code in the CDMA transmission system as claimed in claim 18, wherein said phase estimation means obtains an estimated received phase of said long code from an output of said I-correlator, and an estimated received phase of said long code from an output of said Q-correlator, and estimates said received phase of said long code by averaging these two estimated received phases.

22. A receiver in a CDMA system which demodulates desired information by receiving a received signal including a spread signal and an a priori code, said spread signal being spread by a long code which is a spreading code with a period longer than information symbol, said a priori code having a negligibly small cross-correlation with said long code, and representing a phase of said long code, said receiver comprising:

first correlation means for generating a replica of said long code, and for calculating a correlation between said received signal and said replica of said long code;

second correlation means for generating a replica of said a priori code, and for calculating a correlation between said received signal and said replica of said a priori code;

phase estimation means for estimating received phase of said long code based on an output of said second correlation means; and means for controlling a generation phase of said replica of said long code based on an output of said phase estimation means.

23. A CDMA transmission system comprising:

long code generating means for generating a long code which is a spreading code with a period longer than information symbol;

spreading means for generating a wideband spread signal by spreading transmission information using said long code;

a priori code generating means for generating a priori code representing a phase of said long code, a cross-correlation between said a priori code and said long code being negligibly small;

a priori code insertion means for inserting said a priori code into said spread signal at a predetermined fixed interval to form frames;

transmission means for transmitting said frames;

receiving means for receiving said frames;

first correlation means for generating a replica of said long code, and for calculating a correlation between a received signal and said replica of said long code;

second correlation means for generating a replica of said a priori code, and for calculating a correlation between said received signal and said replica of said a priori code;

phase estimation means for estimating received phase of said long code based on an output of said second correlation means; and means for controlling a generation phase of said replica of said long code based on an output of said phase estimation means.

24. A transmission method in a CDMA transmission system comprising the steps of:

generating a long code which is a spreading code with a period longer than information symbol;

generating a wideband spread signal by spreading transmission information using said long code;

generating a priori code representing a phase of said long code, a cross-correlation between said a priori code and said long code being negligibly small;

inserting said a priori code into said spread signal at a predetermined fixed interval to form frames; and transmitting said frames.

25. An acquisition method of a spreading code in a CDMA transmission system which demodulates desired information by receiving a received signal including a spread signal and an a priori code, said spread signal being spread by a long code which is a spreading code with a period longer than information symbol, said a priori code having a negligibly small cross-correlation with said long code, and representing a phase of said long code, said acquisition method comprising the steps of:

generating a replica of said long code;

calculating a correlation between said received signal and said replica of said long code;

generating a replica of said a priori code;

calculating a correlation between said received signal and said replica of said a priori code;

estimating received phase of said long code based on said correlation between said received signal and said replica of said a priori code; and controlling a generation phase of said replica of said long code based on an estimated received phase of said long code.

26. A CDMA transmission method comprising the steps of:

generating a long code which is a spreading code with a period longer than information symbol;

generating a wideband spread signal by spreading transmission information using said long code;

generating a priori code representing a phase of said long code, a cross-correlation between said a priori code and said long code being negligibly small;

inserting said a priori code into said spread signal at a predetermined fixed interval to form frames;

transmitting said frames;

receiving said frames;

generating a replica of said long code;

calculating a correlation between said received signal and said replica of said long code;

generating a replica of said a priori code;

calculating a correlation between said received signal and said replica of said a priori code;

estimating received phase of said long code based on said correlation between said received signal and said replica of said a priori code; and controlling a generation phase of said replica of said long code based on an estimated received phase of said long code.

* * * * *